(12) United States Patent
Pinnavaia et al.

(10) Patent No.: US 7,132,165 B2
(45) Date of Patent: *Nov. 7, 2006

(54) ULTRA-STABLE LAMELLAR MESOPOROUS SILICA COMPOSITIONS AND PROCESS FOR THE PREPARATION THEREOF

(75) Inventors: Thomas J. Pinnavaia, East Lansing, MI (US); Seong-Su Kim, Lansing, MI (US); Wenzhong Zhang, Tulsa, OK (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 185 days.

This patent is subject to a terminal disclaimer.

(21) Appl. No.: 10/272,751

(22) Filed: Oct. 17, 2002

(65) Prior Publication Data

US 2003/0095908 A1    May 22, 2003

Related U.S. Application Data

(62) Division of application No. 09/436,839, filed on Nov. 9, 1999, now Pat. No. 6,528,034.

(51) Int. Cl.
  *B01J 20/10*    (2006.01)
(52) U.S. Cl. ............... 428/404; 423/326; 502/407
(58) Field of Classification Search ........... 423/326, 423/332, 327.1, 331; 428/403, 404; 502/407
  See application file for complete search history.

(56) References Cited

U.S. PATENT DOCUMENTS

| | | | |
|---|---|---|---|
| 5,102,643 A | 4/1992 | Kresge et al. | |
| 5,672,556 A | 9/1997 | Pinnavaia et al. | |
| 5,712,402 A | 1/1998 | Pinnavaia et al. | |
| 5,785,946 A | 7/1998 | Pinnavaia et al. | |
| 5,800,800 A | 9/1998 | Pinnavaia et al. | |
| 5,840,264 A | 11/1998 | Pinnavaia et al. | |
| 5,855,864 A | 1/1999 | Pinnavaia et al. | |
| 6,358,486 B1 * | 3/2002 | Shan et al. | 423/326 |
| 6,800,266 B1 * | 10/2004 | Pinnavaia et al. | 423/328.1 |

OTHER PUBLICATIONS

Sing et al., Pure Appl. Chem. vol. 57, 603-619 (1985).
Breck, D.W., Zeolite Molecular Sieves: Structure Chemistry and Use : Wiley and Sons; London (1974).
Meier et al., Atlas of Zeolite Structure Types, Butterworth, London (1992).
Gies et al., Zeolites, vol. 12, 42-49 (1992).
Perspectives in Molecular Sieve Science, Eds. Flank, W. H. and White T.E., Jr., ACS Symposium series No. 368, Wash. D.C., 247; 524;544 (1988).
Gunnawardane et al., Zeolites, vol. 8, 127-131 (1988).
Beck, et al., J. Am. Chem. Soc., vol. 114, 10834-10843 (1992).
Ozin, G.A., Acc. Chem. Res. 30 17 (1997).
Ozin, G.A., et al., Nature 386 692 (1997).
Mann, S., et al., Chem Mater. 9 2300 (1997).
Schacht, S., et al., Science 273 768 (1996).
Lin, H.P., et al., Science 273 765 (1996).
Oliver, S., et al., Nature 378 47 (1995).
Dubois, M., et al. Langmuir 9 673 (1993).
Huo, Q., et al., Chem Mater. 9 14 (1997).
Tanev, P. T., et al., Science 271 1267 (1996).
Tanev, P. T., et al., J. Am. Chem. Soc. 119 8616 (1997).
Kresge, C.T., et al., Nature 359 710 (1992).
Ogawa, M., J. Am. Chem. Soc. 116 7941 (1994).
Lu, Y., et al., Nature 389 364 (1997).
Linsker, R., et al., J. Am. Chem Soc. 67 1581 (1945).
Richer et al., Chem. Commun. 1775-1776 (1998).
Brown et al., Chem. Commun. 69-70 (1999).
Alfredsson, V., et al., J. Chem. Soc. Chem. Commun. 921 (1994).
Tanev, P.T., et al., Chem Mater. 8 2068 (1996).
Ryoo, R., et al., Stud. Surf Sci. Catal 105 45 (1997).
Ryoo. R., et al., J. Phys. Chem. 100 17718 (1996).
Zhao, D, et al., Science 279 548 (1998).
Horvath, G., et al., J. Chem. Eng. Jpn., 16, 470-475 (1983).
White et al., Chem. Mater., 9, 1226 (1997).
Short, F. W. et al., J. Am. Chem. Soc., 80, 223, (1958).
Huo, et al., Science 268 1324 (1995).

* cited by examiner

*Primary Examiner*—Stuart Hendrickson
(74) *Attorney, Agent, or Firm*—Ian C. McLeod

(57) ABSTRACT

Novel lamellar mesoporous silica compositions which can contain functional inorganic elements and organic functional groups as part of the lamellar silica framework structure are described. The compositions are prepared using gemini amine surfactants as templates or structure directing agents. The compositions have novel high temperature and hydrothermal stability and unique fundamental particle structures.

8 Claims, 14 Drawing Sheets

FIG. 1A
MSU-G Mesostructure Formation
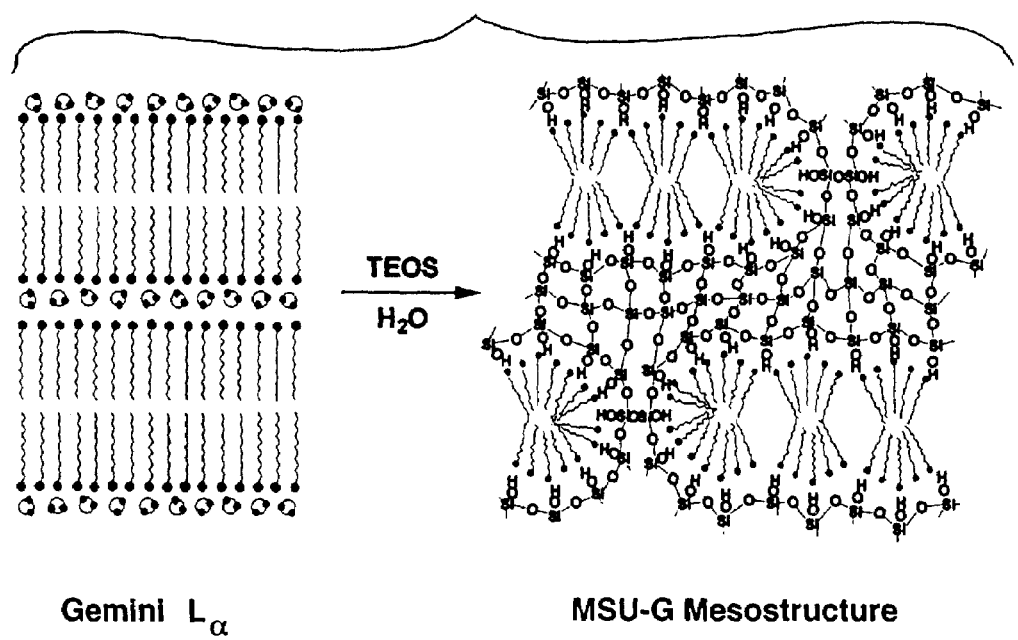
Gemini $L_\alpha$        MSU-G Mesostructure
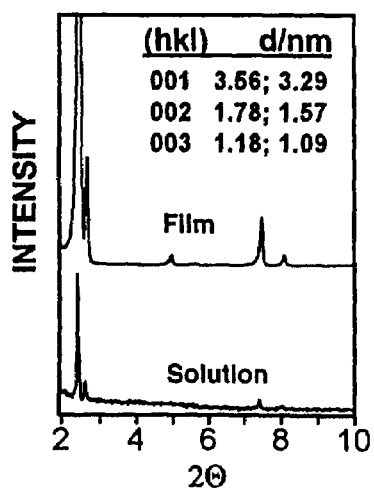
FIG. 1B
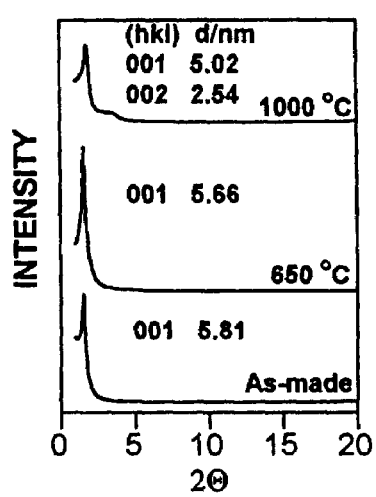
FIG. 1C

ULTRA-STABLE LAMELLAR MESOPOROUS SILICA COMPOSITIONS AND PROCESS FOR THE PREPARATION THEREOF

This application is a divisional application Ser. No. 09/436,839 filed on Nov. 9, 1999 now U.S. Pat. No. 6,528,034

GOVERNMENT RIGHTS

This invention was funded by the National Science Foundation (NSF CHE-96-33798 and CHE-99-03706). The U.S. Government has certain rights in this invention.

FIELD OF THE INVENTION

The present invention relates to novel mesoporous, lamellar silica compositions and to a method for the preparation thereof. In particular the present invention relates to the use of novel gemini amine surfactants as templating or structure directing agents.

DESCRIPTION OF RELATED ART

Porous materials created by nature or by synthetic design have found great utility in all aspects of human activity. The pore structure of the solids is usually formed in the stages of crystallization or subsequent treatment. Depending on their predominant pore size, the solid materials are classified as: (i) microporous, having pore sizes <20 Å; (ii) macroporous, with pore sizes exceeding 500 Å; and (iii) mesoporous, with intermediate pore sizes between 20 and 500 Å. The use of macroporous solids as adsorbents and catalysts is relatively limited due to their low surface area and large non-uniform pores. Microporous and mesoporous solids, however are widely used in adsorption, separation technology and catalysis.

Owing to the need for higher accessible surface area and pore volume for efficient chemical processes, there is a growing demand for new, highly stable mesoporous materials. Porous materials can be structurally amorphous, paracrystalline, or crystalline. Amorphous materials, such as silica gel or alumina gel, do not possess long range order, whereas paracrystalline solids, such as γ- or η-$Al_2O_3$ are quasiordered as evidenced by the broad peaks on the x-ray diffraction patterns. Both classes of materials exhibit a broad distribution of pores predominantly in the mesoporous range. This wide pore size distribution limits the shape selectivity and the effectiveness of the adsorbents, ion-exchanges and catalysts prepared from amorphous and paracrystalline solids.

Hereafter, in order to clarify one of the objects of the present invention, the terms framework-confined uniform porosity and textural porosity are defined and differentiated. Framework-confined uniform pores are pores formed by nucleation and crystallization of the framework elementary particles. These pores typically are cavities and channels confined by the solid framework. The size of the cavities and channels, i.e. the size of the framework-confined uniform pores, in molecular sieve materials is highly regular and predetermined by the thermodynamically favored assembly routes. The framework-confined pores of freshly crystallized product are usually occupied by the template cations and water molecules. While water molecules are easily removed by heating and evacuation the ionic templating materials, such as quaternary ammonium cations, due to their high charge density, are strongly bonded or confined to the pore cavities and channels of the negatively charged framework. The same concepts are expected to apply for the charge reversed situation where an anionic template is confined in the pores of a positively-charged framework. Therefore, a cation or anion donor or ion pairs are necessary in order to remove the charged template from the framework of the prior art molecular sieves.

Textural porosity is the porosity that can be attributed to voids and channels between elementary particles or aggregates of such particles (grains) Each of these elementary particles in the case of molecular sieves is composed of certain number of framework unit cells or framework-confined uniform pores. The textural porosity is usually formed in the stages of crystal growth and segregation or subsequent thermal treatment or by acid leaching. The size of the textural pores is determined by the size, shape and the number of interfacial contacts of these particles or aggregates. Thus, the size of the textural pores is usually at least one or two orders of magnitude larger than that of the framework-confined pores. For example, the smaller the particle size, the larger the number of particle contacts, the smaller the textural pore size and vice versa. One skilled in the art of transmission electron spectroscopy (TEM) could determine the existence of framework-confined micropores from High Resolution TEM (HRTEM) images or that of framework-confined mesopores from TEM images obtained by observing microtomed thin sections of the material as taught in U.S. Pat. No. 5,102,643.

One skilled in the art of adsorption could easily distinguish and evaluate framework-confined uniform micropores by their specific adsorption behavior. Such materials usually give a Langmuir type (Type I) adsorption isotherm without a hysteresis loop (Sing et al., Pure Appl. Chem. vol. 57, 603–619 (1985)). The existence of textural mesoporosity can easily be determined by one skilled in the art of SEM, TEM and adsorption. The particle shape and size can readily be established by SEM and TEM and preliminary information concerning textural porosity can also be derived. The most convenient way to detect and assess textural mesoporosity is to analyze the $N_2$ or Ar adsorption-desorption isotherm of the solid material. Thus, the existence of textural mesoporosity is usually evidenced by the presence of a Type IV adsorption-desorption isotherm exhibiting well defined hysteresis loop in the region of relative pressures Pi/Po>0.4 (Sing et al., Pure Appl. Chem. 57 603–619 (1985)). This type of adsorption behavior is quite common for a large variety of paracrystalline materials and pillared layered solids.

The only class of porous materials possessing rigorously uniform pore sizes is that of zeolites and related molecular sieves. Zeolites are microporous highly crystalline aluminosilicates. Their lattice is composed by $TO_4$ tetrahedra (T=Al and Si) linked by sharing the apical oxygen atoms. Oriented $TO_4$ tetrahedra, consists of cavities and connecting windows of uniform size (Breck, D. W., Zeolite Molecular Sieves: Structure, Chemistry and Use; Wiley and Sons; London (1974)). Because of their aluminosilicate composition and ability to discriminate small molecules, zeolites are considered as a subclass of molecular sieves. Molecular sieves are crystalline non-aluminosilicate framework materials in which Si and/or Al tetrahedral atoms of a zeolite lattice are substituted by other T atoms such as B, Ga, Ge, Ti, V, Fe, or P.

Zeolite frameworks are usually negatively charged due to the replacement of $Si^{4+}$ by $Al^{3+}$. In natural zeolites this charge is compensated by alkali or alkali earth cations such as $Na^+$, $K^+$ or $Ca^{2+}$. In synthetic zeolites the charge can also be balanced by ammonium cations or protons. Synthetic zeolite and molecular sieves are prepared usually under hydrothermal conditions from aluminosilicate or phosphate gels. Their crystallization, according to the hereafter discussed prior art, is accomplished through prolonged reaction in an autoclave for 1–50 days and, often times, in the presence of structure directing agents (templates). The proper selection of template is of extreme importance for the preparation of a particular framework and pore network. A large variety of organic molecules or assemblies of organic molecules with one or more functional groups are known in the prior art to give more than 85 different molecular sieve framework structures (Meier et al., Atlas of Zeolite Structure Types, Butterworth, London (1992)). An excellent review of the use of various organic templates and their corresponding structures, as well as the mechanism of structure directing is given for example in Gies et al., Zeolites, vol. 12, 42–49 (1992). Due to their uniform pore size, unique crystalline framework structure and ability for isomorphous substitution synthetic zeolites and molecular sieves are extremely suitable for a number of adsorption, separation and catalytic processes involving organic molecules. Recently, it has been discovered that synthetic zeolites and molecular sieves can be functionalized by partially substituting the framework T-atoms with such metal atoms capable of performing different chemical (mostly catalytic) tasks. As a result, a large variety of highly selective catalysts have been reported during the last decade. In the spectrum of molecular sieve catalyst a special place is occupied by the metal-substituted, high silica molecular sieves (Si/Al ratio>5). Such molecular sieves are highly hydrophobic and therefore exhibit high affinity toward organic molecules. Among these important materials the microporous Ti-substituted high silica molecular sieve, silicalite-1 (denoted TS-1), with MFI structure and pore size of ≈6 Å is quickly emerging as a valuable industrial catalyst due to its ability to oxidize organic molecules at mild reaction conditions.

The microporous transition metal-substituted zeolites and molecular sieves of the prior art exhibit mainly framework-confined uniform micropores, and little or no textural mesoporosity as evidenced by their Langmuir type adsorption isotherms accompanied with poorly developed hysteresis loops at Pi/Po>0.4. The typical values for their specific surface area are from 300–500 m$^2$/g and for the total pore volume≦0.6 cm$^3$/g (Perspectives in Molecular Sieve Science, Eds. Flank, W. H. and White T. E. Jr., ACS symposium series No. 368, Washington D. C., p. 247; 524; 544 (1988)). All known microporous high silica metallosilicates are prepared by prolonged crystallization at hydrothermal conditions, using single quaternary ammonium cations or protonated primary, secondary or tertiary amines to assemble the anionic inorganic species into a microporous framework. The use in the prior art of neutral amines and alcohols as templates (Gunnawardane et al., Zeolites, vol. 8, 127–131 (1988)) has led to the preparation of microporous highly crystalline (particle size>2 μm) molecular sieves that lack appreciable textural mesoporosity. For the mesoporous molecular sieves of the MCM-41 family the uniform mesopores are also framework-confined. This has been verified by TEM lattice images of MCM-41 shown in U.S. Pat. No. 5,102,643. Therefore, the framework of this class of materials can be viewed as an expanded version of a hexagonal microporous framework. The existence of these framework-confined uniform mesopores was also confirmed by the capillary condensation phenomenon observed in their adsorption isotherms. The lack of appreciable hysteresis beyond Pi/Po>0.4 implies the absence of textural mesoporosity. This lack of textural mesoporosity is also supported in some cases by the highly ordered hexagonal prismatic shaped aggregates of size>2 μm (Beck et al., J. Am. Chem. Soc., vol. 114, 10834–10843 (1992)). The total pore volume of the material reported by Davis et al. is ≈0.7 cm$^3$/g and that of the framework-confined mesopores, as determined from the upper inflection point of that hysteresis loop, is almost equal to that of the total pore volume. Therefore, the ratio of textural to framework-confined mesoporosity here approaches zero. The size of the framework—confined uniform mesopores is ≈30 Å.

There is a need for mesoporous molecular sieve structures exhibiting high thermal and hydrothermal stability (i.e., large framework crosslinking and large wall thickness), small particle size and complementary framework-confined and textural mesoporosity. Also, there is a need for a new preparation art to these ordered mesostructures which would allow for cost reduction by employing less expensive reagents and mild reaction conditions while at the same time providing for the effective recovery and recyclability of the neutral template.

Significant progress has been made recently in extending the supramolecular assembly of mesostructured inorganic framework structures to include hierarchical forms with a variety of particle shapes (Ozin, G. A., Acc. Chem. Res. 30 17 (1997); G. A. Ozin, et al., Nature 386 692 (1997); Mann, S., et al., Chem. Mater. 9 2300 (1997); Schacht, S., et al., Science 273 768 (1996); and Lin, H. P., et al., Science 273 765 (1996)). Mesoporous metal oxide molecular sieves with vesicle-like morphologies are of special interest as potential catalysts and sorbents, in part, because the mesostructured shells and intrinsic textural pores of the vesicles should efficiently transport guest species to framework binding sites. However, all of the vesicle-like mesostructures reported to date have shells of undesirable thickness. More importantly, like many mesoporous molecular sieves with conventional particle morphologies, the framework structures defining the vesicle shells are lacking in structural stability. For instance, a vesicular aluminophosphate with mesoscale d-spacing and surface patterns that mimic diatom and radiolarian skeletons collapses to AlPO$_4$-cristobalite with complete loss of the hierarchical patterns at 300° C. (Oliver, S., et al., Nature 378 47 (1995)). Also, vesicle-like silicic acid polymers templated by didodecyldimethylammonium bromide lose their hierarchical structures simply upon washing with alcohols (Dubois, M., et al., Langmuir 9 673 (1993)). Macroscopic hollow spheres of mesoporous MCM-41 (Schacht, Q., et al., Science 273 768 (1996); and Huo, Q., et al., Chem. Mater. 9 14 (1997) have been prepared from oil-in-water emulsions, but these particles have shells that are very thick (1000–5000 nm) and comparable in size to mesostructures with conventional particle. The feasibility of forming vesicular mesoporous silicas has been demonstrated recently by an assembly pathway based on the use of an amine bolaamphiphile as the structure directing agent (Tanev, P. T., et al., Science 271 1267 (1996)). However, the shell thickness (100–250 nm) was large compared to the vesicle diameter (300–800 nm). More importantly, the thermal and hydrothermal stability was unremarkable, and the particle shape deviated greatly from the desired vesicular form with increasing surfactant chain length (Tanev, P. T., et al., J. Am. Chem. Soc. 119 8616 (1997)).

Although several surfactant systems are known to direct the assembly of lamellar silica mesostructures (Tanev, P. T., et al., Science 271 1267 (1996); Tanev, P. T., et al., J. Am. Chem. Soc. 119 8616 (1997); Kresge, C. T., et al., Nature 359 710 (1992); J. S. Beck et al., J. Am. Chem. Soc. 114 10834 91992); Ogawa, M., J. Am. Chem. Soc. 116 7941

(1994); and Lu, Y., et al., Nature 389 364 (1997)), none is capable of generating an entire family of thermally and hydrothermally stable lamellar silicas. Related mesoporous silica art using amine templates to assemble mesostructured silicas is described in U.S. Pat. Nos. 5,672,556, 5,712,402, 5,785,946, 5,800,800, 5,840,264 and 5,855,864 to Pinnavaia et al. These products also have relatively poor hydrothermal stability.

SUMMARY OF THE INVENTION

The present invention relates to a lamellar mesoporous silica composition containing an electrically neutral gemini amine surfactant in mesopores, the composition having at least one x-ray diffraction peak corresponding to a basal spacing between about 4 and 10 nm and wherein cross-linking of $SiO_4$ tetrahedra to four adjacent silicon sites ($Q^4$) and to three adjacent silicon sites ($Q^3$) corresponds to a $Q^4/Q^3$ ratio of at least 5. The notation $Q^4$ and $Q^3$ refers to distinguishable linkages for the $SiO_4$ units in the silica framework. The silicon atoms in $Q^4$ tetrahedra are linked through bridging oxygen atoms to four other silicon centers, whereas the silicon atoms of $Q^3$ tetrahedra are linked to three other silicon centers through bridging oxygens. $Q^2$ and $Q^1$ linkages also are possible, but they occur in very low abundance in comparison to $Q^3$ and $Q^4$ linkages. The siting of the $SiO_4$ tetrahedra in the framework is readily determined by $^{29}Si$ NMR spectroscopy. Silica frameworks with a high $Q^4/Q^3$ ratio are especially desirable. The larger the $Q^4/Q^3$ ratio, the more completely crosslinked and, hence, the more stable, is the framework. All previously reported mesostructured silicas exhibit $Q^4/Q^3$ ratios near 2.0 in as-synthesized form. Calcining the mesostructures increases the ratio to values near 3.0. The especially large $Q^4/Q^3$ values of at least 5.0 are unprecedented for mesostructured silica compositions. Accordingly, these compositions are associated with novel thermal and hydrothermal stability.

The present invention also relates to a lamellar mesoporous metal oxide and silica composition derived from a silica composition containing an electrically neutral gemini amine surfactant in mesopores, which surfactant has been removed from the silica composition which is then treated with a compound containing one or more functional inorganic elements and then heating the treated silica composition to form the metal oxide and silica composition.

The present invention further relates to a lamellar mesoporous silica composition with at least one x-ray diffraction peak corresponding to a basal spacing of between about 4 and 10 nm and wherein cross-linking of the $SiO_4$ tetrahedra of the silica to four adjacent silicon sites ($Q^4$) and to three adjacent silicon sites ($Q^3$) corresponds to a $Q^4$ to $Q^3$ ratio of at least 5.

The present invention also relates to a lamellar mesoporous silica composition with at least one x-ray diffraction peak corresponding to a basal spacing of between about 4 and 10 nm and wherein cross-linking of the $SiO_4$ tetrahedra sites of the silica to four adjacent silicon sites ($Q^3$) corresponds to a $Q^4$ to $Q^3$ ratio of at least 5, and produced from a lamellar silica composition containing a neutral gemini amine surfactant which is removed to produce the lamellar mesoporous silica composition.

The present invention relates to a method for forming a lamellar mesoporous silica composition which comprises: reacting in a reaction mixture a lower alkyl tetraorthosilicate with a gemini amine surfactant to form the lamellar mesoporous silica composition; and separating the composition from the reaction mixture.

Finally, the present invention relates to a lamellar mesoporous silica composition containing an electrically neutral gemini amine surfactant in mesopores defining the silica composition.

The present invention discloses that an electrically neutral hydrogen bonding pathway based on the hydrolysis of a silicon alkoxide, such as tetraethylorthosilicate (TEOS), in the presence of gemini amine surfactants at a temperature in a range between about 50 and 150° C. results in the assembly of lamellar silica mesostructures that are mesoporous and exceptionally stable under thermal and hydrothermal conditions. Moreover, the lamellar framework silicas adopt a hierarchical particle structure that is typically vesicular, bowl-like, and ribbon-like in shape. When the assembly is carried out under non-hydrothermal conditions between about 30 and 50° C., a wormhole framework structure is formed.

The term "particle" as used herein means a fundamental un-agglomerated object with a hierarchical shape which is determined microscopically. These fundamental particles agglomerate to form larger aggregates of particles. The preferred fundamental particles of the present invention are in large part vesicular or bowl-shaped with a diameter between about 10 and 1400 nm and a shell thickness between about 2.0 and 200 nm which is quite thin and unique in comparison to the prior art. Preferably there are between about 1 and 50 nanolayers of silica providing the thickness of the shell. Each silica nanolayer has an elementary thickness in the range 2.0–10 nm. The shell thickness of a vesicle or bowl is determined by the nesting of the nanolayers, one atop another. The nested nanolayers are separated by lower density silica pillars that create channels and pores between the silica lamellae. Vesicular and bowl-shaped particles provide excellent textural mesoporosity and facilitate access of guest molecules to the adsorption sites and the reaction sites of the lamellar framework structure. Consequently, the compositions of the present invention are especially useful as adsorbents and heterogeneous catalysts.

The nesting and folding of the framework silica nanolayers affords, in addition to vesicles and bowl-like particles, fundamental particles with shapes that may be described as folded ribbons, open-ended tubes, and spheres formed by the concentric nesting of spherically folded silica nanolayers in a manner akin to the assembly of the structural elements of an onium. The shapes of these elegant particle objects all result from the folding and nesting of silica nanolayers with a thickness in the range 3.0–10 nm.

The term "surfactant" means a surface active agent wherein the molecule has a hydrophobic segment adjacent to a hydrophilic polar head group. The term "gemini amine surfactant" means that the hydrophilic polar head group of the surfactant contains at least two (2) amino groups separated by 1 to 4 carbon atoms. There also can be more than two of the amino groups contributing to the polarity of the hydrophilic head group. The gemini amine surfactants that are especially preferred in forming the lamellar mesostructures of the present invention have the following general molecular structure represented by the formula:

$RNH(CH_2)_mNHR^1$ wherein R is a hydrophobic segment, $R^1$ is hydrogen, methyl, ethyl or a —$(CH_2)_mNH_2$ group and m is an integer between 1 and 4. An example of a suitable hydrophobic segment is an aliphatic group of the type $C_nH_{2n+1}$ where n=8 to 20. Gemini amine surfactants of the type

$C_nH_{2n+1}NH(CH_2)_2NH_2$ are especially effective in forming the mesostructured compositions of the present invention. Linsker, R., et al., J. Am. Chem. Soc. 67 1581 (1945) describes the synthesis of some of these gemini amine surfactants. Some are available commercially.

The pure mesostructured silica compositions of the present invention are useful as adsorbents and supports for catalysts of different kinds. For instance certain acids, such as phosphoric acid and heteropolyacids of the type $H_3PW_{12}O_{40}$, $H_4SiW_{12}O_{40}$ and polyoxometallate related species, can be supported in the framework pores of the pure lamellar silica mesostructures. Highly dispersed metals in reduced elemental form, such as nickel, platinum, palladium, iridium, rhodium, rhenium, ruthenium, as well as metal oxides, such as $SnO_2$, $V_2O_5$, $ZrO_2$ and many other oxides, and sulfides, such as Co/Mo sulfides, can be supported as nanosized particles in the framework pores of the pure silica mesostructures. All of the said catalytic compounds can be introduced into the framework pores of the lamellar mesostructure through the impregnation of suitable precursors by methods well known to those skilled in the art of catalyst formulations.

Although the pure lamellar silica mesostructures of the invention are useful as high surface area adsorbents and catalyst supports, they become even more useful as catalysts and adsorbents when they are functionalized through the introduction of one or more reactive inorganic elements into the lamellar framework structure of the mesostructured silica. The introduction of one or more functional organic groups into the silica framework, such as those with sequestering properties for metal ions, organic acid-base properties, or any of a large variety of organic functional groups for chemical catalysis and for cross-linking the silica framework to a polymer matrix, also greatly extends the utility of the lamellar mesoporous silicate compositions. Organic functional groups with metal ion sequestering properties, when integrated into the framework of the lamellar silica, behave as metal ion traps for the removal of toxic metals from contaminated water and waste streams. Organofunctional groups with acidic or basic properties allow the functionalized silicas to be used as acidic or alkaline catalysts. Other organic functionalities, such as acid anhydride, epoxide, vinyl and many other well-recognized reactive moieties, allow the framework to be linked through chemical bond formation to other organic guest molecules in the framework pores and at the external surfaces of the lamellar silica mesostructures. These latter hybrid compositions have many desired properties.

A lamellar mesoporous composition wherein the composition has the formula $M_xSi_{1-x}O_q$ when written in anhydrous form where M is an inorganic element other than silicon or oxygen, x is between about 0.001 and 0.35, and y is between about 1.80 and 2.25, the composition having at least one x-ray diffraction peak corresponding to a basal spacing between about 4 and 10 nm and wherein cross-linking of $SiO_4$ tetrahedra to four adjacent silicon sites ($Q^4$) and to three adjacent silicon sites ($Q^3$) corresponds to a $Q^4/Q^3$ ratio of at least 5.

One or more other inorganic elements can be incorporated into the silica framework structures of this invention to form lamellar mixed oxides. These functionalized mixed oxide derivatives have compositions of $M_aO_b$—$SiO_2$ when written in anhydrous form, wherein M is a least one element other than silicon or oxygen and a and b provide an elemental balance in $M_aO_b$. Alternatively, the compositions of the functionalized lamellar mixed oxide derivatives of the present invention expressed by the following formula when written in anhydrous form:

$$M_xSi_{1-x}O_q$$

where M is at least one element which forms an oxide and is preferably selected from the group consisting of B, Al, Ga, Fe, Co, Mn, Cr, Ge, Ti, V, Ni, Sn, Sb, Zr, W, Mo, Ca, Cu, Pb, In, Nb, Sr, and Zn. In the calcined composition x is between 0.001 and 0.35 and q is between about 1.5 and 2.5. Preferably x is between about 0.005 and 0.35. Preferably q is between about 1.80 and 2.25.

Two general methods may be used to introduce one or more reactive inorganic elements into the said mixed oxide compositions of the lamellar silica mesostructures of this invention. One method is to incorporate the desired element or elements into the framework as the framework is being assembled in the presence of the gemini amine surfactant. This is the so-called "direct assembly" pathway to the said $M_xSi_{1-x}O_q$ oxide compositions. Alkoxides of the desired element or elements are preferred as precursors, in part, because they are miscible with the silicon alkoxides that are used as precursors to the silica framework. The second, more preferred, method is the so-called "post-synthesis reaction" method wherein the desired element or elements are introduced into the silica framework through the reaction of the pre-assembled lamellar silica framework structure with a desired element precursor. The post-synthesis reaction may be carried out in the presence of the gemini surfactant in the framework mesopores or, more preferably, the surfactant can be removed from the silica framework mesopores through solvent extraction or calcination prior to reaction of the framework with the desired element precursors to afford the desired $M_xSi_{1-x}O_q$ compositions.

Ordinarily, the said direct synthesis method provides lamellar $M_xSi_{1-x}O_q$ compositions wherein the value of x is low, typically in the range x=0.001–0.01. At higher values of x, and depending on the element or collection of elements represented by M, the lamellar framework structure is lost. Alkoxides are the most desired precursors for introducing functional M elements into the silica framework by the direct synthesis route. Alkoxides of many di-, tri-, tetra-, penta- and hexavalent elements are known and many of these are commercially available. One or more of the precursor alkoxides may be mixed with the precursor alkoxide of silicon in producing the desired $M_xSi_{1-x}O_q$ functional compositions.

The said post-synthesis route to the lamellar $M_xSi_{1-x}O_q$ compositions of this invention is preferred. Because the lamellar framework is pre-assembled, the lamellar framework, as well as the hierarchical particle morphology, is retained upon insertion of the reactive M centers into the framework. Typically, one or more M species may be inserted into the lamellar silica framework at x values over the range 0.001–0.35. Alkoxides are suitable reagents for the post-synthesis pathway to the desired lamellar $M_xSi_{1-x}O_q$ compositions. However, post-synthesis pathway is not limited to the use of alkoxides as reagents for the insertion of M centers into the lamellar silica framework. Many lower-cost salts and metal complexes also are suitable reagents for the post-synthesis pathway to lamellar $M_xSi_{1-x}O_q$ compositions. For instance, aluminum centers can be introduced into the preassembled lamellar silica framework by reaction of the as-synthesized, solvent-extracted, or calcined forms of the silica mesostructure with salts of aluminum, such as aluminum nitrate and sodium aluminate. Any aluminum salt is effective in inserting aluminum centers into the silica framework. $M_xSi_{1-x}O_q$ compositions with M=Al are especially desired because the aluminum centers introduce acidic sites that are useful in catalyzing important organic chemical conversions, such as alkylation reactions and cracking reactions.

The present invention provides a route to the synthesis of organic-inorganic metal oxide compositions with well defined framework-confined mesopores. The compositions produced in the current invention are distinguished from those of the prior art by the virtue of the method of preparation of the present invention, the subsequent architecture of the mesoporous structure and the range of templated organic-substituted metal oxides that is afforded by this route. Formation of the mesoporous network is accomplished by interaction (complexation and/or hydrogen-bonding) between a gemini amine surfactant template and neutral inorganic and organic precursors, followed by hydrolysis and subsequent condensation of the inorganic reaction product under either ambient or elevated temperature reaction conditions and the subsequent removal of the solvent phase and the template. The compositions also have intra- and interparticle textural mesoporosity, in addition to framework mesoporosity.

The present invention particularly provides a preferred nonionic route to the preparation of quasi-crystalline inorganic-organic oxide compositions comprising (a) preparing a homogeneous solution or emulsion of a gemini amine surfactant by stirring, sonicating or shaking at ambient temperature and pressure; (b) addition of one or more of each of neutral inorganic and organic precursors with stirring at ambient temperatures and pressures to the emulsion of step (a) at ambient temperature to form a precipitated semi-crystalline product; allowing the mixture to age for a period of time at a temperature between 85° and 150° C., more preferably between 100°–120° C.; (c) separating the solvent and the hydrolyzing agent from the precipitated product by filtration or centrifugation; and (d) extracting the template through solvent extraction whereby the solvent is either water or ethanol, or an ethanol-water mixture, or alternatively removing the surfactant through calcination at temperatures in excess of 400° C.

The present invention thus provides a new route to mesostructured silica compositions with uniform, well defined, framework-confined mesopores that can be utilized as adsorbents, metal ion traps, solid acids and bases, and catalysts and catalyst supports for the catalytic conversion of organic substrates. According to the method of the present invention the formation of the mesoporous structure is accomplished primarily by interaction (complexation and/or hydrogen bonding) between template molecules within micellar aggregates of a gemini amine surfactant and neutral organic and inorganic oxide precursors, followed by hydrolysis and cross-linking of $IO_x$ units, wherein between 65 and 100% of the I units are $SiO_4$ units and the remainder are metallic or non-metallic elements coordinated to x oxygen atoms ($2 \leq x \leq 8$). This interaction is most likely to occur between an I—OH unit and the $NH_2$ functions of each surfactant molecule, or between the I—OH unit and the array of lone pair electrons on the template polar segment. The polar segment of the template in the present invention is flexible and appears to act in the fashion of a ligand complexing through hydrogen bonding to a I—OH unit, thereby stabilizing a site of nucleation for subsequent condensation of the mesoporous quasi-crystalline organic and inorganic oxide product, although the inventors do not want to be bound to any particular theory.

The prior art does not describe the preparation of micro-, meso-, or macro-porous inorganic oxide compositions by such a nonionic mechanism involving crystallization of organic and inorganic oxide precursors around well defined micelles of the gemini amine surfactants. Specifically, the present results are achieved by using micelles of the surfactant to template and assemble neutral inorganic and organic reactant precursors into a mesoporous framework structure. Complexation and/or hydrogen bonding between the template and the reagent is believed to be the primary driving force of the assembly of the framework in the current invention. The aforementioned method consists of the formation of a solid precipitate by the mixing of a solution or emulsion of electrically neutral gemini amine surfactant, with a neutral inorganic, usually inorganic alkoxide, and an organic oxide precursor in the presence of a hydrolyzing agent, followed by aging assembly temperatures between ambient and 150° C. for at least 8 hours. The template may be recovered by extraction with ambient temperature alcohol or hot water-ethanol mixtures or it can be removed by calcination at temperatures above 500° C. Thus both the compositions and methodologies of the present invention differ fundamentally from previous art in which cationic gemini surfactants are used to assemble mesostructures (Huo, et al., Science, 268 1324 (1995)). When the gemini surfactant is made cationic through the presence of quaternary ammonium ions on the polar head group, as disclosed in the prior art of Huo et al, the assembly reaction is under electrostatic (columbic) control and different mesostructured frameworks are formed.

The template may be removed from the condensed reaction products by solvent extraction of the template from the air dried material using an organic solvent such as an alcohol or using hot water or using a hot alcohol-water mixture.

The synthesis methods for the formation of MSU-G materials involve the preparation of solutions or emulsions of a gemini amine surfactant template compound and reaction of this solution with a silicon alkoxide precursor and optionally including di-, tri-, tetra-, penta- or hexa-valent metal or metalloid hydrolyzable alkoxide reagents and optionally including an organic silane in the presence of a hydrolyzing agent under static, stirring, sonication or shaking and conditions at temperatures in the range 85–150° C. until formation of the desired precipitated product is achieved and recovering the solid material.

The inorganic oxide precursors are single or double metal alkoxide compounds, The list of preferred alkoxides includes but not exclusively: aluminum(III) ethoxide, aluminum(III) isopropoxide, aluminum(III) n-, sec- or tert-butoxide, antimony(III) isopropoxide, antimony (III) n-butoxide, calcium(II) ethoxide, calcium(II) isopropoxide, calcium(II) tert-butoxide, chromium(IV) isopropoxide, chromium(IV) tert-butoxide, copper(II) methoxyethoxide, gallium(III) isopropoxide, germanium(IV) ethoxide, germanium(IV) isopropoxide, indium(III) isopropoxide, iron(III) ethoxide, iron(III) isopropoxide, iron(III) tert-butoxide, lead (II) isopropoxide, lead(II) tert-butoxide, magnesium(II) ethoxide, manganese (II) isopropoxide, molybdenum(v) isopropoxide, niobium(V) ethoxide, silicon(IV) methoxide, silicon(IV) ethoxide, silicon(IV) propoxide, silicon(IV) butoxide, silicon(IV) hexoxide, strontium(II) ethoxide, tin (IV) isopropoxide, titanium(IV) ethoxide, titanium(IV) propoxide, titanium(IV) isopropoxide, titanium(IV) butoxide, titanium(IV) octadecoxide, tungsten(VI) ethoxide, tungsten (VI) isopropoxide, vanadium(V) triisopropoxide oxide, zinc (II) isopropoxide, zinc(II) tert-butoxide, zirconium(IV) n-propoxide, zirconium(IV) isopropoxide, zirconium(IV)

butoxide, zirconium(IV) tert-butoxide, aluminum(III)silicon (IV) alkoxide, titanium(IV)silicon(IV) polyethoxide and other mixtures of the aforementioned alkoxide compounds. The alcohols used in step (i) of the preparation art correspond to the alcoholate ligand from which the metal alkoxide is derived. The alcohols thus preferred are methanol, ethanol, n- and isopropanol and n-, sec-, tert-, butanol. The alcohols contain 1 to 4 carbon atoms.

A lamellar mesoporous composition wherein the composition has the formulas selected from the group consisting of $[(R_1)SiO_{3/2}]_xSiO_2$, $[(R_1)_2SiO]_xSiO_2$, and $[(R_1)_3SiO_{1/2}]_xSiO_2$ and mixtures thereof, when written in anhydrous form where $R_1$ is an organic moiety containing an organic functional group and x is between about 0.01 and 0.30, the compositions having at least one x-ray diffraction peak corresponding to a basal spacing between about 4 and 10 nm and wherein cross-linking of $SiO_4$ tetrahedra to four adjacent silicon sites ($Q^4$) and to three adjacent silicon sites ($Q^3$) corresponds to a $Q^4/Q^3$ ratio of at least 5.

The silica composition of this invention also can contain a substituted organo silane as discussed, for example, by Richer et al., Chem. Commun. 1775–1776 (1998) and Brown et al., Chem. Commun. 69–70 (1999). The materials provide unique surface properties in the as-formed silica composition. These compositions can be produced by direct incorporation of an organosilane during the assembly of the lamellar silica framework or the organo groups can be introduced by post-synthesis reaction of the surface hydroxyl groups of the framework with a suitable organosilane. The post-synthesis method is preferred.

These organo functional derivatives of the lamellar mesostructures of the present invention have the following compositions when written in anhydrous form: $[(R_1)SiO_{3/2}]_xSiO_2$, $[(R_1)_2SiO]_xSiO_2$ and $[(R_1)_3SiO_{1/2}]_xSiO_2$ where $R_1$ is an organic moiety, preferably containing an organo functional group and X is between about 0.01 and 0.30. These compositions have about the same range of XRD basal spacings and XRD and $Q^4/Q^3$ ratios as have been described above for the pure silica frameworks.

The organic silanes which are useful in producing the said organo-functional lamellar silica compositions of the present invention are those which will react to form the mesoporous structure in a direct-synthesis pathway and those that will react with the pre-assembled lamellar silica in a post-synthesis reaction pathway. Included are preferred silanes of the formula:

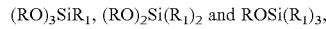
$(RO)_3SiR_1$, $(RO)_2Si(R_1)_2$ and $ROSi(R_1)_3$, where R is hydrogen or a lower alkyl group (1 to 8 carbon atoms). The general formula is $Si(OR)_{4-n}(R_1)_n$ where n is 1, 2 or 3. Another way of expressing the useful silane reagents for the introduction of organic functionality into the lamellar silica framework is through the general formulas $X_3Si(R_1)$, $X_2Si(R_1)_2$ and $XSi(R_1)_3$ where X is any hydrolyzable group which reacts with silica. $R_1$ in the above formulas can be the same as R and can be an organic group which is non-reactive which can be an alkyl, alkoxy, alkenyl or alkynyl, cycloaliphatic, aromatic group containing 1 to 25 carbon atoms. $R_1$ can include substituents of O, N or S and can provide a hydroxide, an aldehyde, acid, base, sulfide, cyanide, mercaptan and the like. Examples of basic moieties especially useful as catalysts include amines and pyridyl groups. Useful acidic functionalities include carboxylic acids, sulfonic acids, and fluorinated sulfonic acids. $R_1$ can contain a halogen selected from the group consisting of F, I, Br or Cl and the $R_1$ group can be further reacted at the halogen group. The preferred $R_1$ contain moieties which are metal binding to provide selective adsorption of metal ions from solution. Especially useful metal trapping agents include organic groups containing chelating ligands such as ethylene diamines, ethylene diamine tri- and tetra acetate, cyclic and bicyclic polyethers known as crown ethers and cryptans and the like. The mixed metal alkoxides and organic-alkoxy silanes can be obtained commercially. Alternatively, they may be specifically prepared for use in forming the desired compositions. Functional organosilanes can be prepared by hydrosilylation of olefins. The desired organo-functional lamellar silica compositions may be prepared most preferably by reaction of the parent lamellar silica with a said organosilane under reflux in toluene for 3–4 hours.

Preferably the $R_1$ group of the said $Si(OR)_{4-n}(R_1)_n$ silanes contains a functional group selected from a metal complex, vinyl, cyano, amino, mercapto, halogen (usually Cl or Br), aldehyde, ketone acid (including sulfonic and F-sulfonic acid or base group). The metal complex functionality helps form structures where the metal is removable and provides increased receptivity to the metal removed.

Examples of commercially available functional silanes which can be used are:
3-(N-allylamino)propyltrimethoxy-silane;
O-allyloxy(polyethyleneoxy)-trimethylsilane;
N-(2-aminoethyl)-3-aminopropylmethyl-dimethoxysilane;
N-(2-aminoethyl)-3-aminopropyltri-methoxysilane N-[3-(trimethoxysilyl)propyl]ethylenediamine;
N-(6-aminohexyl)aminopropyl-trimethoxysilane;
2-[Methoxy(polyethyleneoxy)propyl]trimethoxysilane;
(3-Trimethoxysilylpropyl)diethylene-triamine 95%;
Trivinylmethoxysilane;
3-Cyanopropyldimethylmethoxysilane;
3-Cyanopropyltriethoxysilane;
(3-Cyclopentadienylpropyl)triethoxysilane;
Diphenyldiethoxysilane;
Diphenyldimethoxysilane;
Diphenylsilanediol;
Diphenylvinylethoxysilane;
(Mercaptomethyl)dimethylethoxysilane;
(Mercaptomethyl)methyldiethoxysilane;
3-Mercaptopropylmethyldimethoxysilane;
3-Mercaptopropyltrimethoxysilane;
3-Mercaptopropyltriethoxysilane;
3-Methacryloxypropyldimethylethoxy-silane;
3-Methacryloxypropyldimethylmethoxysilane;
3-Methacryloxypropylmethyldiethoxy-silane;
3-Methacryloxypropylmethyldimethoxysilane;
3-Methacryloxypropyltrimethoxysilane;
Methylphenyldimethoxysilane;
Methyl[2-(3-trimethoxysilylpropylamino)-ethylamino]-3-propionate (65% in methanol);
7-Oct-1-enyltrimethoxysilane;
Phenethyltrimethoxysilane;
N-Phenylaminopropyltrimethoxysilane;
Phenyldimethylethoxysilane;
Phenyltriethoxysilane;
Phenyltrimethoxysilane;
Phenylvinyldiethoxysilane;
N-[3-(triethoxysilyl)propyl]-4,5-dihydro-imidazole;
2-(Trimethoxysilyl)ethyl-2-Pyridine;
Trimethoxysilylpropyldiethylenetriamine (95%);
N[(3-trimethoxysilyl)propyl]ethylene-diamine triacetic acid, trisodium salt (50% in water);
N-(3-trimethoxysilylpropyl)pyrrole;
Triphenylsilanol;

Vinyldimethylethoxysilane;
Vinylmethyldiethoxysilane;
Vinyltriethoxysilane;
Vinyltrimethoxysilane;
N-(trimethoxysilylpropyl)ethylene-diamine, triacetic acid, trisodium salt;
4-Aminobutyldimethylmethoxysilane;
4-Aminobutyltriethoxysilane (95%);
N-(2-aminoethyl)-3-aminopropylmethyldi-methoxysilane;
$H_2NCH_2CH_2CH_2SiOEt$ 3-aminopropyldimethylethoxysilane;
3-Aminopropylmethyldiethoxysilane;
3-Aminopropyldiisopropylethoxysilane;
3-Aminopropyltriethoxysilane;
3-Aminopropyltrimethoxysilane;
N-(triethoxysilylpropyl)urea (50% in methanol)
N-[3-(triethoxysilyl)propyl]phthalamic acid (95%).

The above list is not meant to be limiting, but merely intended to provide examples of easily obtainable functional silanes useful in preparing the compositions of this invention. In general, any functional organosilane may be incorporated into the porous inorganic and organic oxide materials embraced by the present art. Functional organo groups on the silane moiety that are especially useful include acids and bases for catalytic applications, dye chromophores for sensing, linking groups (e.g. epoxides, acid anhydrides, amines, esters, carboxylates and the like) for forming polymer-inorganic nanocomposites, and complexants for binding metal ions. In the latter case the bound metal ions may be recovered by ion exchange or subsequently used in the immobilized state as catalysts for organic chemical transformation.

The templated mesostructured silica compositions of the present invention can be combined with other components, for example, zeolites, clays, inorganic oxides or organic polymers or mixtures thereof. In this way adsorbents, ion-exchangers, catalysts, catalyst supports or composite materials with a wide variety of properties may be prepared. Additionally, one skilled in the art may impregnate or encapsulate transition metal macrocyclic molecules such as porphyrins or phthalocyanins containing a wide variety of catalytically active metal centers.

Additionally, the surfaces of the compositions can be functionalized in order to produce catalytic, hydrophilic or hydrophobic surfaces. The surfaces may be functionalized after synthesis by reaction with various chlorides, fluorides, silylating or alkylating reagents.

In the present invention the gemini amine surfactants can be removed from the as-synthesized mesostructures by solvent extraction to form surfactant-free mesostructures. Useful solvents include polar molecules such as water, alcohols, ketones, nitriles and the like. Preferred is ethanol. The surfactant can also be removed from the as-synthesized mesostructure by calcination. However, preferably the surfactant is removed prior to calcination and can be recycled.

Calcination of the as-synthesized and solvent-extracted mesostructures is achieved at temperatures between about 200° and 1000° C. Furnaces for accomplishing calcination are well known to those skilled in the art.

OBJECTS

It is therefore an object of the present invention to provide novel mesoporous lamellar silica compositions which preferably contain one or more functional inorganic elements or functional organic moieties as part of the lamellar framework structure. Further objects are to provide lamellar silica compositions with high thermal and hydrothermal stability and a unique particle structure. Further still it is an object of the present invention to provide a process for the preparation of the novel silica compositions. Further, it is an object of the present invention to provide silica compositions which are relatively simple to prepare and are economical because of recycling of the unique neutral template used for forming the silica compositions. These and other objects will become increasingly apparent by reference to the following description and the drawings.

BRIEF DESCRIPTION OF DRAWINGS

FIG. 1A is a schematic illustration of the pathway used for the preparation of mesostructured MSU-G silicas. FIGS. 1B and 1C are XRD patterns shown in FIG. 1C for the pristine surfactant which were recorded for a 88:12 (v/v) water:ethanol suspension of neutral $C°_{12-2-0}$ gemini amine surfactant ($C_{12}H_{25}NH(CH_2)_2NH_2$) at the same concentration (3.0 wt %) used for MSU-G synthesis and a thin film sample of the surfactant on glass. The XRD pattern for the as-made and calcined MSU-G samples are shown in the FIG. 1C. The patterns were obtained on a Rigaku Rotaflex Diffractometer equipped with a rotating anode and Cu $K_\alpha$ radiation ($\lambda$=0.1542 nm).

FIG. 2A shows the dominant vesicular morphology. The arrow points to one of the largest vesicles with a diameter of ~1400 nm and a shell thickness of approximately 40 nm. FIG. 2B contains fractured multilamellar vesicles and bowls. Framework mesopores are contained between the undulated silica sheets of the multilamellar vesicles. Each silica layer is ~3 nm thick. FIGS. 2B and 2D also show the presence of wormhole-like framework pores that run orthogonal to the undulated silica sheets, making the pore network three dimensional. The arrows in FIG. 2C point to unilamellar vesicles ~20 nm in diameter. The same hierarchical forms were observed for silicas assembled from gemini surfactants containing alkyl chains with 10 and 14 carbon atoms. The micrographs were obtained on a JEOL 100CX instrument with an electron beam generated by a $CeB_6$ gun operating at an acceleration voltage of 120 kV. The specimens were loaded onto a holy carbon film supported on a copper grid by dipping the grid into a suspension of the silica (1 wt %) in ethanol.

DESCRIPTION OF PREFERRED EMBODIMENTS

Figure 2A:
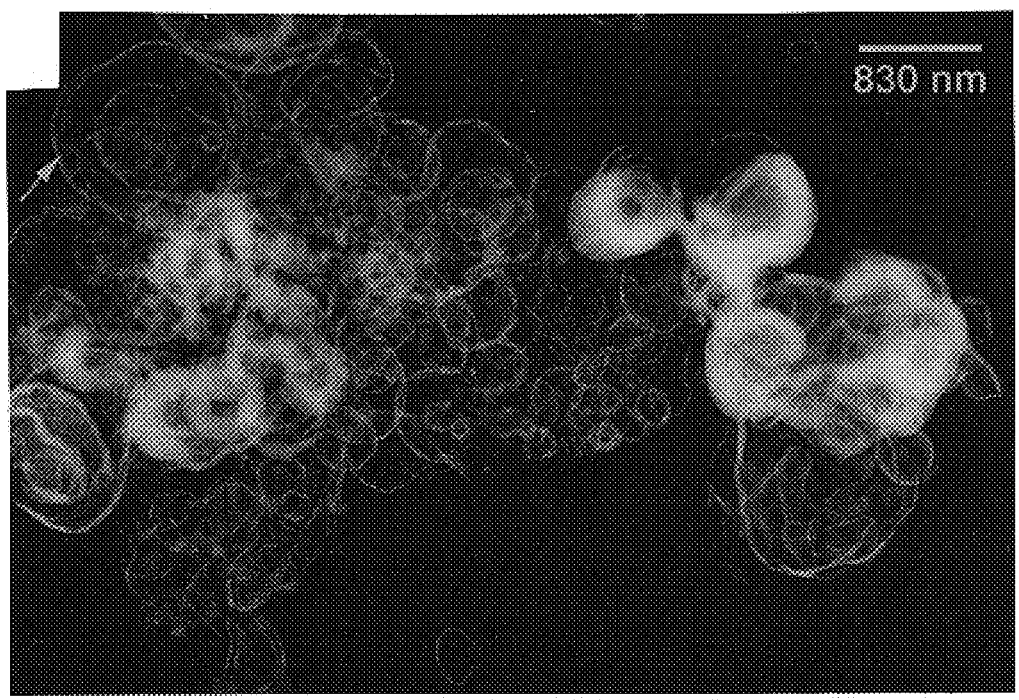
FIGS. 2A and 2B are TEM images of calcined (650° C.) hierarchical forms of lamellar silica assembled from a $C_{12}H_{25}NH(CH_2)_2NH_2$ gemini amine surfactant.

The new family of mesoporous molecular sieves (denoted herein as MSU-G) with vesicle-like hierarchical structures and unprecedented thermal and hydrothermal stabilities were preferably prepared through a supramolecular assembly pathway that relies on hydrogen bonding between electrically neutral gemini amine surfactants most preferably of the type $C_nH_{2n+1}NH(CH_2)_2NH_2$ and silica precursors derived from silicon alkoxides, most preferably tetraethylorthosilicate. The mesostructured framework is constructed of one or more undulated silica sheets ~3 nm thick with mesopores running parallel, as well as orthogonal to the silica sheets, making the framework structure bicontinuous and highly accessible. The silica framework lamellae fold into vesicle- and bowl-like particles, as well as other particle shapes, that introduce textural mesoporosity and facilitate access to the framework surfaces. Depending on the choice of surfactant chain length and the use of co-surfactants, framework mesopores with average diameters of 2.0–10.0 nm are obtainable. Functional elements (e.g., Ti(IV) and Al(III)) have been incorporated into the framework with retention of hierarchical structure. The exceptional structural stability of the mesostructured framework under thermal (1000° C.) and hydrothermal conditions (100° C., >150 h) is associated with intrinsically high $Q^4/Q^3$ $SiO_4$ crosslinking values of at least 5.0. These new mesostructures are especially promising materials for applications in heterogeneous catalysts and molecular separations.

The present invention provides a direct and highly efficient synthesis route to a novel family of lamellar mesoporous silicas and functionalized derivatives of these silicas containing other inorganic elements and organo groups as part of the lamellar framework (denoted MSU-G). Vesicular and bowl-shaped particles with very thin shells (~2 to 70 nm) and diameters of 20 to 1400 nm are often formed through the nesting and folding of the framework lamellae. The vesicle and bowl-shaped particles may be comprised of single framework lamellae 3–10 nm thick or they may be formed through the nesting of many (up to 50) lamellae from the said particles with multi lamellae shells. Moreover, the degree of framework $SiO_4$ unit crosslinking is unprecedented among mesoporous silicas, making these materials ultrastable relative to previously reported mesostructures.

As illustrated schematically in FIG. 1B, MSU-G silicas were obtained by the cooperative transformation of a silicon alkoxide (TEOS) and a lamellar $C°_{n-2-0}$ surfactant phase into an undulated lamellar mesostructure under hydrothermal reaction conditions. For instance, a MSU-G mesostructure was prepared by the hydrolysis and polymerization of TEOS in a 1:9 (v/v) ethanol: water solution of a neutral $C°_{n-2-0}$ gemini surfactant under hydrothermal conditions. The molar ratio of each reaction mixture was 1.0 TEOS:0.25 surfactant:4.3 EtOH:78 $H_2O$. TEOS was added to the surfactant in the water:ethanol mixed solvent under rapid stirring for 3 minutes, and then the mixture was heated at 100° C. in an autoclave for 48 hours under static conditions. The product was filtered, washed with cold ethanol and dried in air. Finally, the surfactant was removed from the as-made product by calcination in air at 650° C. for 4 hours or by extraction with hot ethanol. The XRD pattern of the initial surfactant solution in the absence of TEOS revealed the presence of two lamellar phases with basal spacings (3.56 and 3.29 nm) that differ by one water layer between lipid-like bilayers. These two phases also are observed for a thin film sample of the surfactant supported on glass. The as-synthesized MSU-G mesostructures and the surfactant-free forms obtained by calcination at 650 and 100° C. exhibit one (001) diffraction line or, at most, two diffraction lines (001, 002) consistent with an undulated lamellar structure.

Figure 2B:
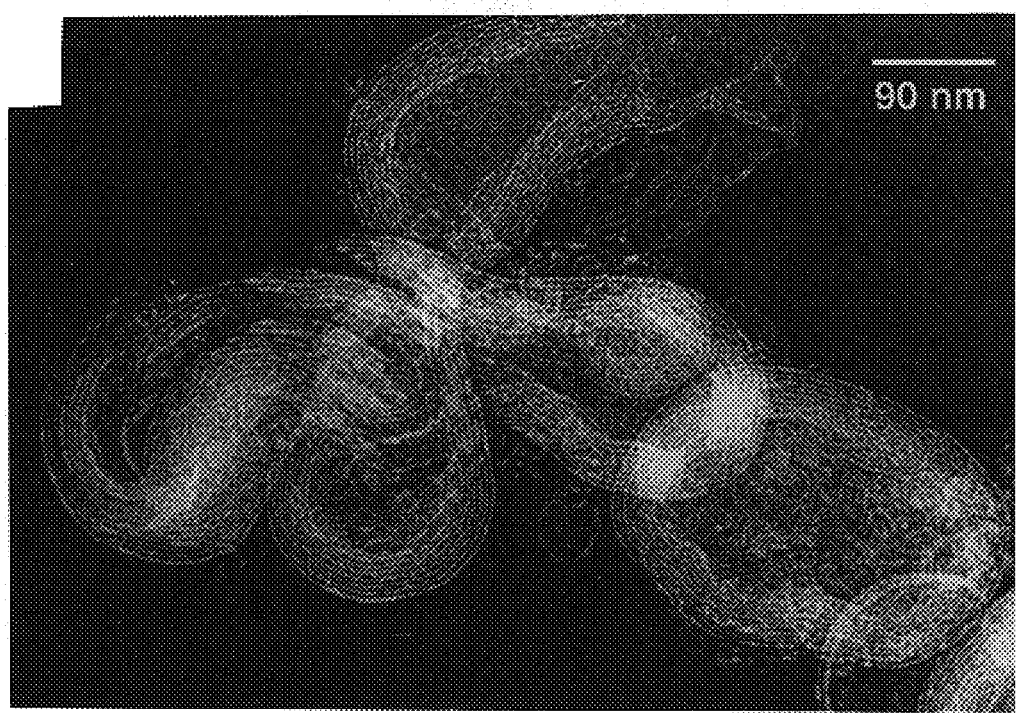
Figure 2C:
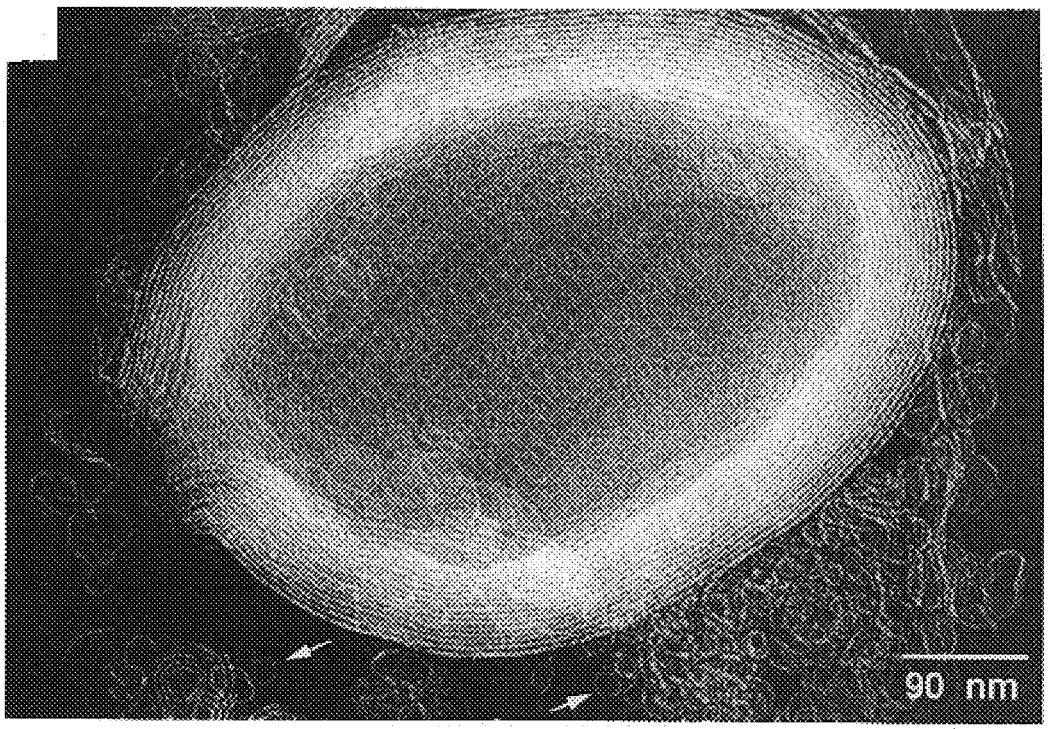
Figure 2D:
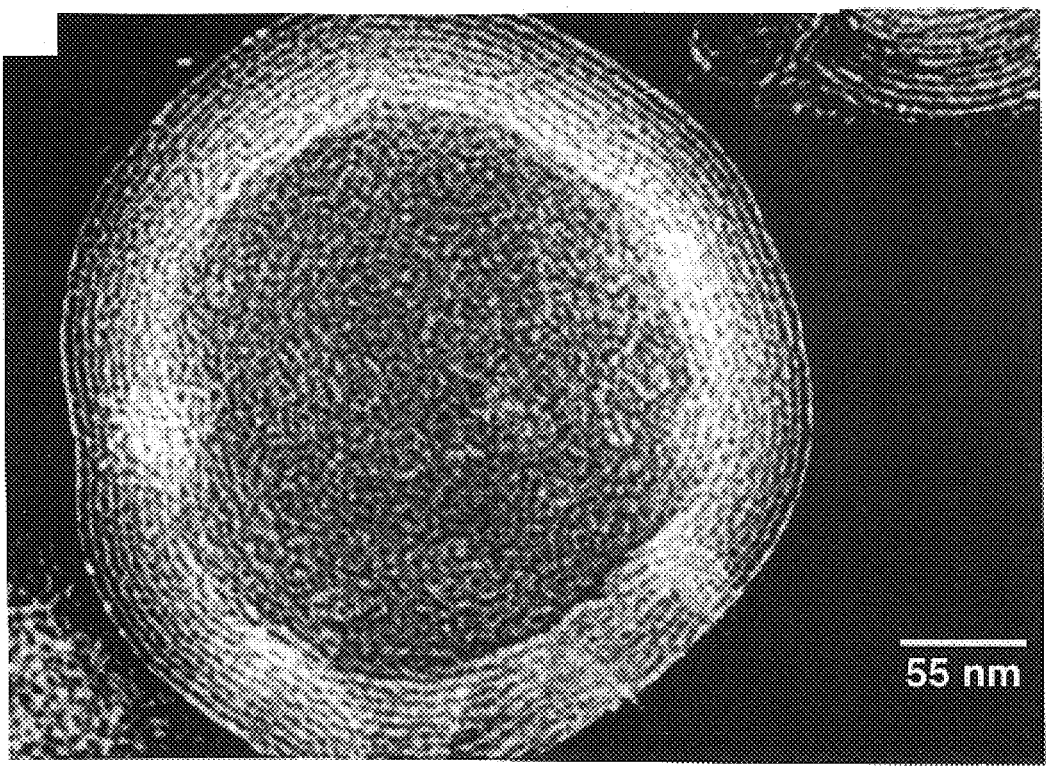

The representative TEM image shown in FIG. 2A illustrates the lamellar framework structure and vesicular particle morphology of MSU-G silicas. Three $C°_{n-2-0}$ surfactants with n=10, 12 and 14 all form silica mesostructures with the same dominant vesicle-like shapes. Nearly all of the particles (>90%) may be described as being complete vesicles or, more commonly, ruptured vesicles (FIGS. 2B, 2C), and bowls (FIG. 2D). The rims of the bowls and the edges of the ruptured vesicles clearly reveal a framework structure made up of undulated silica layers approximately 3.0 nm thick with irregularly spaced mesopores running parallel to the lamellae. Bridging of the silica layers is also evident in the micrographs. In addition, the rounded surfaces of the vesicular and bowl-shaped fragments show randomly distributed framework pores orthogonal to the silica sheets. Consequently, each 3-nm thick sheet contains mesopores that connect to the interlayer mesopores, allowing the pore system to be three-dimensional. Consisting with vesicle formation through a layer propagation and bending process, the smaller vesicles with diameters in the range ~20–125 nm have very thin unilamellar shells (~3 nm), whereas the larger vesicles with diameters up to 1400 nm have multilamellar shells up to ~70 nm in thickness.

FIG. 3 shows the $N_2$ adsorption-desorption isotherms and Horvath-Kawazoe (HK) pore size distributions for calcined MSU-G silicas prepared from gemini surfactants of differing alkyl chain length. The adsorption steps at relative pressures between 0.20 and 0.65 signify the filling of framework mesopores, and the hysteresis loops at higher relative pressures are a consequence of $N_2$ filling the textural mesopores associated with a vesicular (lamellar) particle morphology. In accord with an assembly pathway based on hydrogen-bond interactions between the surfactant and the inorganic framework walls, the surfactant could be readily removed from the framework pores by hot ethanol extraction, as judged by $^{13}$C CP MAS NMR. The $N_2$ adsorption and desorption isotherms for the solvent extracted samples were nearly identical to those obtained for the calcined derivative.

As summarized in Table 1 hereinafter, the maxima in the HK pore size distribution curves increase in the order 2.7, 3.2 and 4.0 nm as the surfactant chain length is increased over the range n=10, 12, 14, respectively. Also, an increase in the surfactant chain length increases both the d-spacing and the pore size. Consequently, the framework wall thickness (FWT) remains almost constant (2.1–2.5 nm) and in reasonable agreement with the value estimated from TEM images (~3.0 nm). Interestingly, the FWT values are about 2.5 to 3.0 times larger than the values observed for electrostatically assembled MCM-41 silicas (Alfredsson, V., et al., J. Chem. Soc. Chem. Common. 921 (1994); and Tanev, P. T., et al., Chem. Mater. 8 2068 (1996)). Accordingly, the thicker framework walls result in BET surface areas (280–520 m$^2$/g) that are proportionately lower than the values typically found for MCM-41 (900–1200m$^2$/g)

Figure 4:
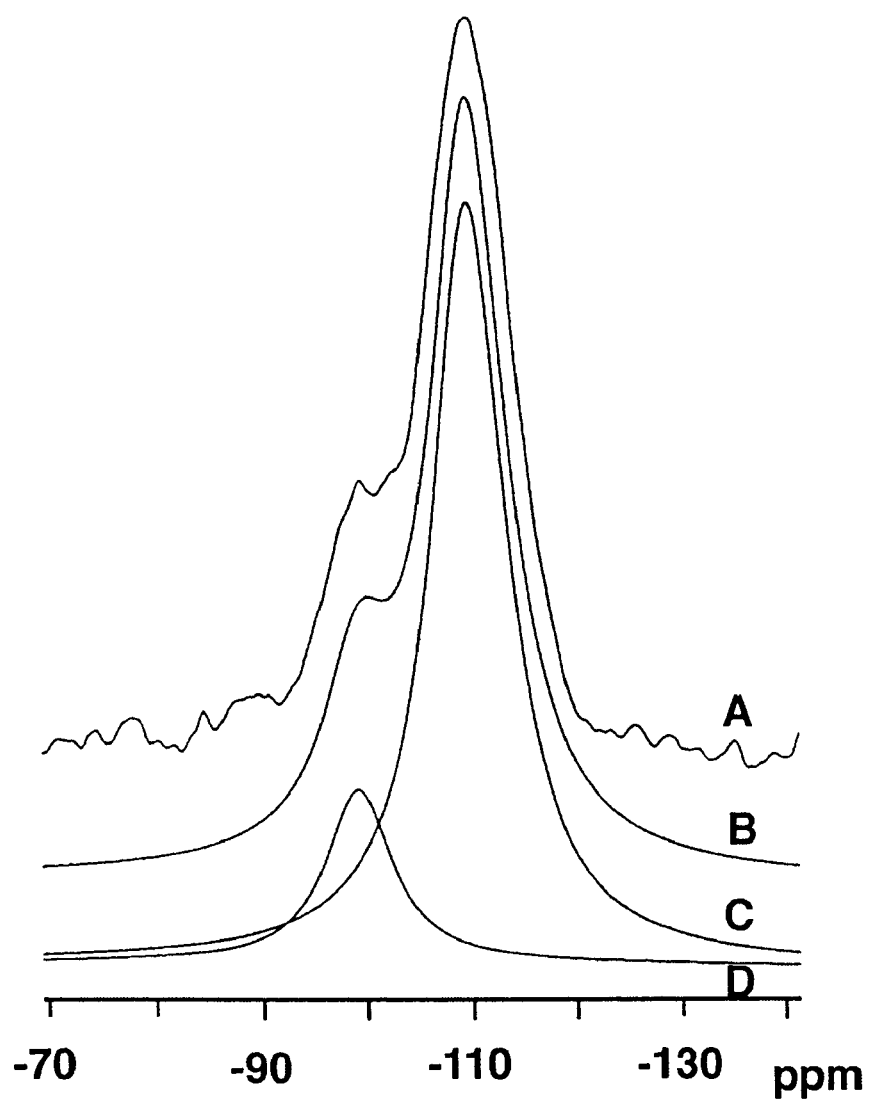
FIG. 4 is a graph showing: (A) the experimental $^{29}$Si-MAS-NMR spectrum of as-synthesized lamellar silica mesostructure assembled using the gemini surfactant $C_{12}H_{25}NH(CH_2)_2NH_2$ as the structure director. Curve (B) is the sum of the deconvoluted $Q^4$ and $Q^3$ spectral components represented by curves (C) and (D), respectively, with relative integral intensities of 6.2:1.0. The single pulse mode $^{29}$Si MAS NMR spectrum was recorded on a Varian 400 VRX spectrometer using a 7 mm zirconia rotor, a spinning frequency of 4 kHz, and a pulse delay of 800 s.

A further important distinction between MSU-G silicas and previously reported mesoporous silicas is the very high degree of SiO$_4$ unit crosslinking in the framework and the structural stability that results from this crosslinking. As shown by the deconvoluted $^{29}$Si MAS NMR spectra in FIG. 4, the as-made MSU-G framework consists primarily of fully crosslinked Q$^4$ SiO$_4$ units with a resonance near −100 ppm, and a smaller fraction of incompletely crosslinked Q$^3$ sites (−98 ppm). Three different as-made MSU-G mesostructures yielded Q$^4$/Q$^3$ ratios in the range 6.2 to 7.4 (c.f., Table 1). Normally, as-made silica mesostructures, whether assembled from ionic or neutral surfactants, exhibit Q$^4$/Q$^3$ ratios ≦2.0, and their calcined derivatives typically have values near 3.0 (Kresge, C. T., et al., Nature 359 710 (1992); J. S. Beck, et al., J. Am. Chem. Soc. 114 10834 (1992); and Alfredsson, V., et al., J. Chem. Soc. Chem. Common. 921 (1994)). Interestingly, the Q$^4$/Q$^3$ ratios for MSU-G do not change greatly upon calcination at 650° C., suggesting that the SiOH groups may be site isolated and buried in the framework.

Consistent with the remarkable degree of framework crosslinking, the thermal and hydrothermal stabilities of MSU-G silicas are unprecedented among all previously reported mesostructures, regardless of framework composition or framework structure. In addition to being structurally stable to calcination at 1000° C. (c.f., FIG. 1B), MSU-G silicas are stable in boiling water for >150 hr. In contrast, it was found that MCM-41 and other electrostatically assembled silicas with benchmarked hydrothermal stabilities, including framework-stabilized KIT-1 silica mesostructures (Ryoo, R., et al., Stud. surf. Sci. Catal. 105 45 (1997); Ryoo, R., et al., J. Phys. Chem. 100 17718 (1996)) and the thick-walled SBA-15 family of silicas (Zhao, D., et al., Science 279 548 (1998)), become X-ray amorphous and lose accessible framework mesoporosity in less than 50 hours when subjected to equivalent hydrothermal conditions. The lamellar silica phases assembled in the presence of bolaamphiphile amines (Tanev, et al., J. Amer. Chem. Soc., 119 9164 (1997)) also decompose in less than 50 hours in water at 100° C.

The combination of a three-dimensional pore network and a vesicle-like hierarchical morphology for MSU-G silicas, in addition to their remarkable thermal and hydrothermal stability, has important implications for their use in chemical catalysis and molecular separations. Most mesostructured molecular sieves, particularly those prepared through an electrostatic pathway, exhibit framework pore lengths on a micrometer length scale, comparable to the length scale of the mesostructured particles themselves. Consequently, access to the framework sites can be limited by diffusion along the pore length, particularly for reactions in condensed media. A combined vesicular morphology and three-dimensional pore network allows the average diameter and length of the mesopores within a particle to be more comparable in their dimensions, thus greatly facilitating access. As a first step toward the catalytic applications of such structures, redox-active Ti(IV) and acidic Al(III) centers have been incorporated into the framework of MSU-G silicas through post-synthesis reactions with titanium isopropoxide and sodium aluminate without altering the lamellar framework or the vesicular hierarchical structure.

EXPERIMENTAL EXAMPLES 1 TO 3

Thirty five milliliters of deionized $H_2O$ was mixed with five milliliters of ethanol under stirring and the appropriate amount of neutral Gemini surfactant template (see Table 1) was added. These neutral Gemini surfactants used in the preparation were synthesized by previously described procedures (F. Linsker and R. L. Evans, J. Am. Chem. Soc., 67, 158 (1945)). The resultant mixture was stirred at room temperature for 20 hours until a milky solution of template was obtained. A 5.2 gram-quantity of $Si(OC_2H_5)_4$ was added to the above solution of template and stirred at room temperature for 3 minutes. The reaction stoichiometry expressed in terms of moles per mole $SiO_2$ corresponded to the following:

0.25 moles $C_nH_{2n+1}NH(CH_2)_2NH_2$
78 moles $H_2O$
4.3 moles of EtOH.

The resulting gels were transferred into a Teflon-lined autoclave and aged at 100° C. for 48 hours under autogenous pressure. After the autoclave was cooled to room temperature, the as-synthesized products were filtered, washed with water and ethanol, and air-dried. The template was removed through solvent extraction and(or) calcination in air at 650° C. for 4 hours.

The X-ray diffraction patterns of all samples were measured on a Rigaku Rotaflex diffractometer equipped with rotating anode and Cu—K$_\alpha$ radiation (λ=0.15148 nm). The diffraction data were recorded by step-scanning at 0.02 degrees of 2θ per step, where θ is the Bragg angle. The d-spacing of the X-ray reflections of the samples were calculated in Angstrom units (Å). Transmission electron micrographs were obtained on a JEOL JEM 100CX II electron microscope. The specimen was suspended in ethanol loaded on carbon coated copper grids (400 mesh). The sample images were obtained using an accelerating voltage of 120 kV, a beam diameter of approximately 5 μm and an objective lens aperture of 20 μm. The single-pulse mode $^{29}$Si MAS NMR spectrum was recorded on a Varian VXR-400S spectrometer with a 7 mm zirconia rotor, a spinning frequency of 4 kHz and a pulse delay of 800 s. The pore structure of the said samples was characterized by measuring the $N_2$ adsorption-desorption isotherms on a Coulter Omnisorp 360 CX Sorptometer at −195° C. using standard continuous sorption procedures. Before the measurement, each sample was heated overnight at 150° C. and 10$^{-6}$ Torr. The specific surface area ($S_{BET}$, m$^2$/g) and the total pore volume ($V_t$, cc/g) were calculated from the isotherms following the IUPAC recommendations (Sing et al., Pure Appl. Chem. 57, 603–619 (1985)) . The pore size distribution of the materials was calculated using the method of Horvath and Kawazoe (G. Horvath and K. J. Kawazoe, J. Chem. Eng. Jpn., 16, 470–475 (1983)). Thermogravimetric analyses of the samples were performed under a flow of dry $N_2$ gas on a CAHN system thermogravimetric gas (TG) analyzer using a heating rate of 5° C./min. The amounts of each surfactant used in the Examples 1–3, together with the corresponding physicochemical parameters are summarized in Table 1.

TABLE 1

| Example | Template chain length | Amount of Template used (g) | $d_{001}$ (Å) | HK pore size (Å) | BET Surface area[a] ($m^2/g$) | Wall thickness[b] (Å) | $Q^4/Q^{3c}$ |
|---|---|---|---|---|---|---|---|
| 1 | $C_{10}$ | 1.25 | 48.0 | 27 | 523 | 21 | 7.1 |
| 2 | $C_{12}$ | 1.43 | 56.6 | 32 | 412 | 25 | 6.2 |
| 3 | $C_{14}$ | 1.60 | 64.9 | 40 | 279 | 25 | 7.4 |

[a]The framework-confined mesoporous size was determined by Hovarth-Kawazoe (HK) analysis of the $N_2$ adsorption isotherm.
[b]The framework wall thickness is determined by subtracting the HK mesopore size from the d-spacing.
[c]$Q^4/Q^3$ ratios for the framework $SiO_4$ units in as-synthesized products.

Figure 3A:
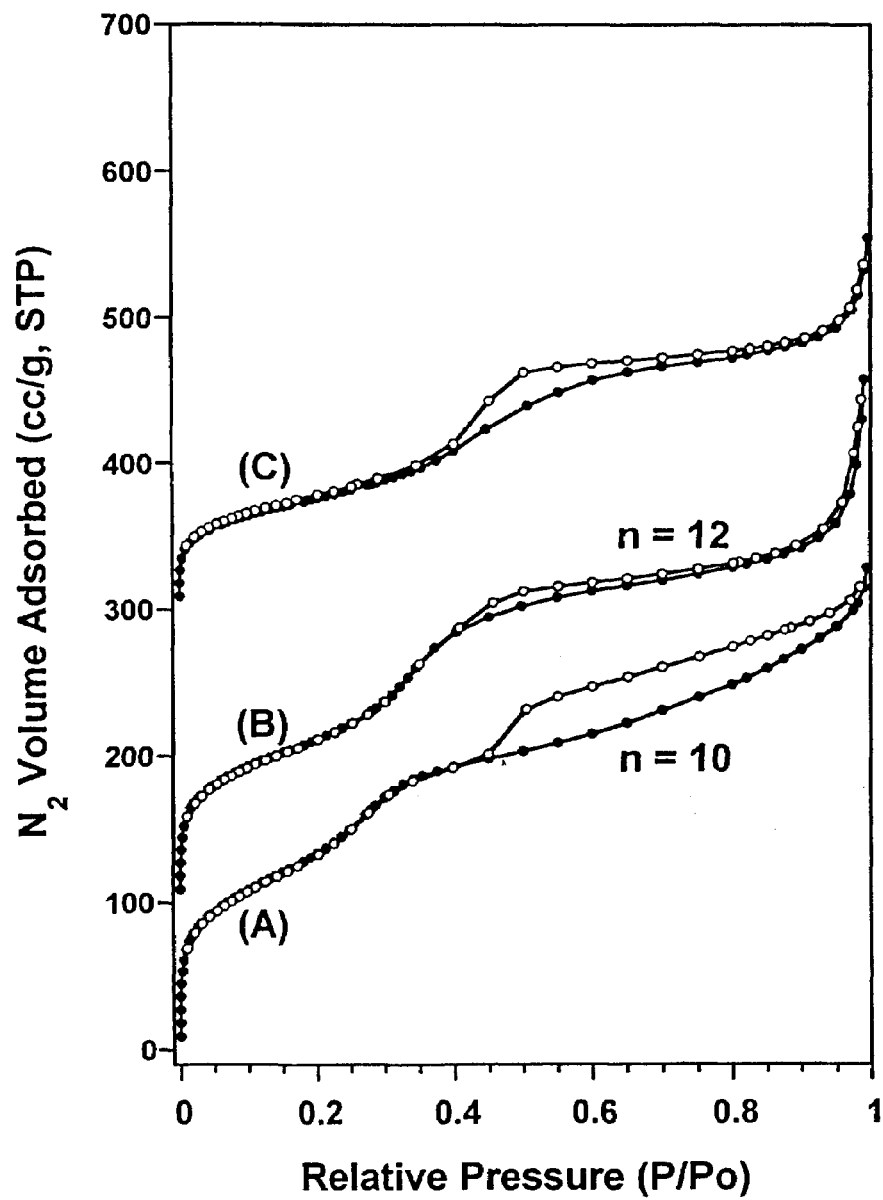
FIG. 3A is a graph showing $N_2$ adsorption/desorption isotherms for calcined (650° C.) lamellar silicas assembled from $C_nH_{2n+1}NH(CH_2)_2NH_2$ surfactants (n=10, 12 and 14).
Figure 3B:
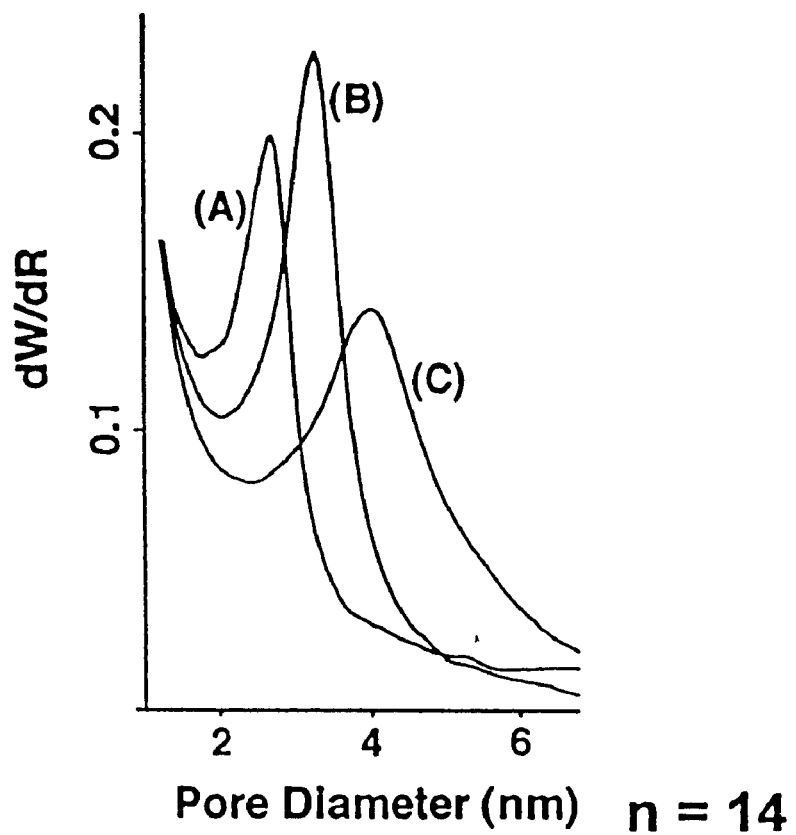
FIG. 3B provides the Horvath-Kawazoe pore size distributions obtained from the adsorption branch of the isotherms. The isotherms were obtained on a Micromeritics ASAP 2010 Sorptometer at −196° C. Samples were out-gassed at 150° C. overnight under vacuum ($10^{-5}$ torr) . Isotherms B and C have been offset by 100 and 300 cc/g, respectively, along the vertical axis for clarity.
Figure 5:
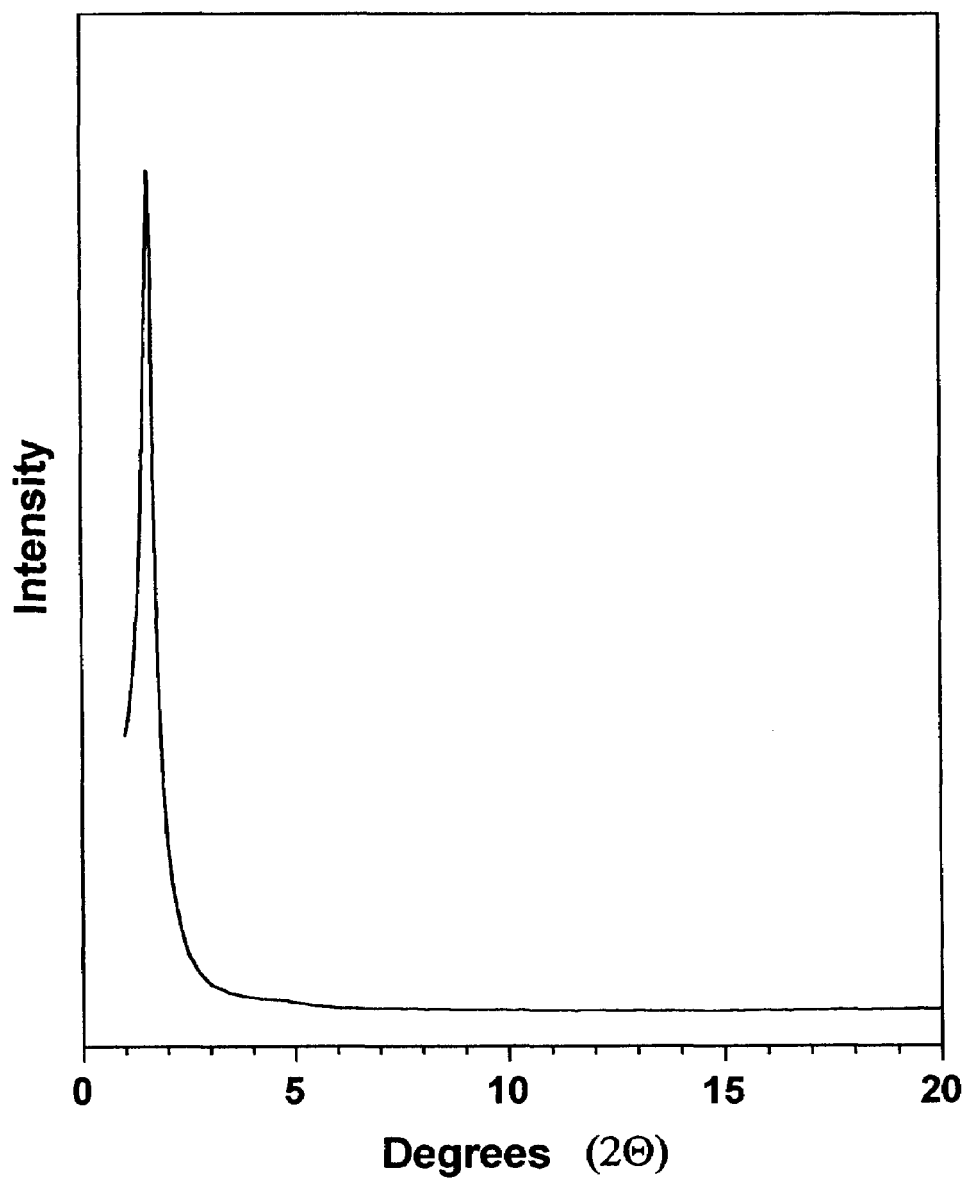
FIG. 5 is a graph showing a X-ray powder diffraction pattern of the product of calcined Example 2 at 650° C. for 4 hours.

The X-ray diffraction pattern of the calcined product of Example 2 is shown in FIG. 5. It exhibits a sharp and strong relative intensity peak at 56±1.0 Å d-spacing. The transmission electron microscope (TEM) image of this product, presented as FIGS. 2A to 2C shows typical vesicular morphology with undulated silica layers. The $N_2$ adsorption-desorption isotherms and Horvath-Kawazoe (HK) pore size distributions for calcined products are shown in FIGS. 3A and 3B. The adsorption steps at relative pressures between 0.20 and 0.65 signify the filling of framework mesopores, and hysteresis loops at higher relative pressures are a consequence of $N_2$ filling the textural mesopores that are associated with a vesicular (lamellar) particle morphology. The data in Table 1 reveal that the compositions of the present invention possess much larger framework wall thickness (from 21 to 25 Å) than the reported of MCM-41 (from 8 to 12 Å). Thus, our compositions are expected to possess a much higher thermal and hydrothermal stability than that observed for the other mesoporous materials. The as-synthesized products yielded high $Q^4/Q^3$ ratio (cross-linked $SiO_4$) in the range from 6.2 to 7.4. This remarkable high $Q^4/Q^3$ ratios for as-synthesized products (FIG. 4) are over 3 times higher than those of MCM-41 and HMS silicas (less than 2.0). To distinguish this new family Mesoporous silica molecular sieves from others, they are designated as MSU-G molecular sieves.

COMPARATIVE EXAMPLES 4–5

The following examples were prepared to test the thermal and hydrothermal stabilities of MCM-41 and KIT-1 samples which can be- the comparison for the stability of the product of Example 2. The thermal and hydrothermal stability of mesoporous materials is a crucial factor for practical applications.

MCM-41 used in the Example 4 was prepared at 100° C. for 4 d by reported procedure involving a sequential acid titration approach using $H_2SO_4$ (White et al., Chem. Mater., 9, 1226 (1997)). KIT-1 used in the Example 5 was made using cetyltrimethylammonium chloride and sodium silicate (LUDOX-40) under basic conditions in the presence of large amounts of $Na_4EDTA$ as a structure promoter (Ryoo et al., Stud. Surf. Sci. Cat., 105, 45 (1997)). The reason for choosing KIT-1 was that KIT-1 was claimed to be a better material for thermal and hydrothermal stability than conventionally prepared MCM-41.

The thermal stability of samples was tested at 1000° C. for 4 hours in the air. The hydrothermal stability of the product was investigated by mixing 0.1 grams of the calcined product at 650° C. for 4 hours with 10 milliliters deionized water and heating in a closed bottle at 100° C. under static conditions. The stability was examined by XRD and $N_2$ adsorption-desorption isotherms.

Figure 6:
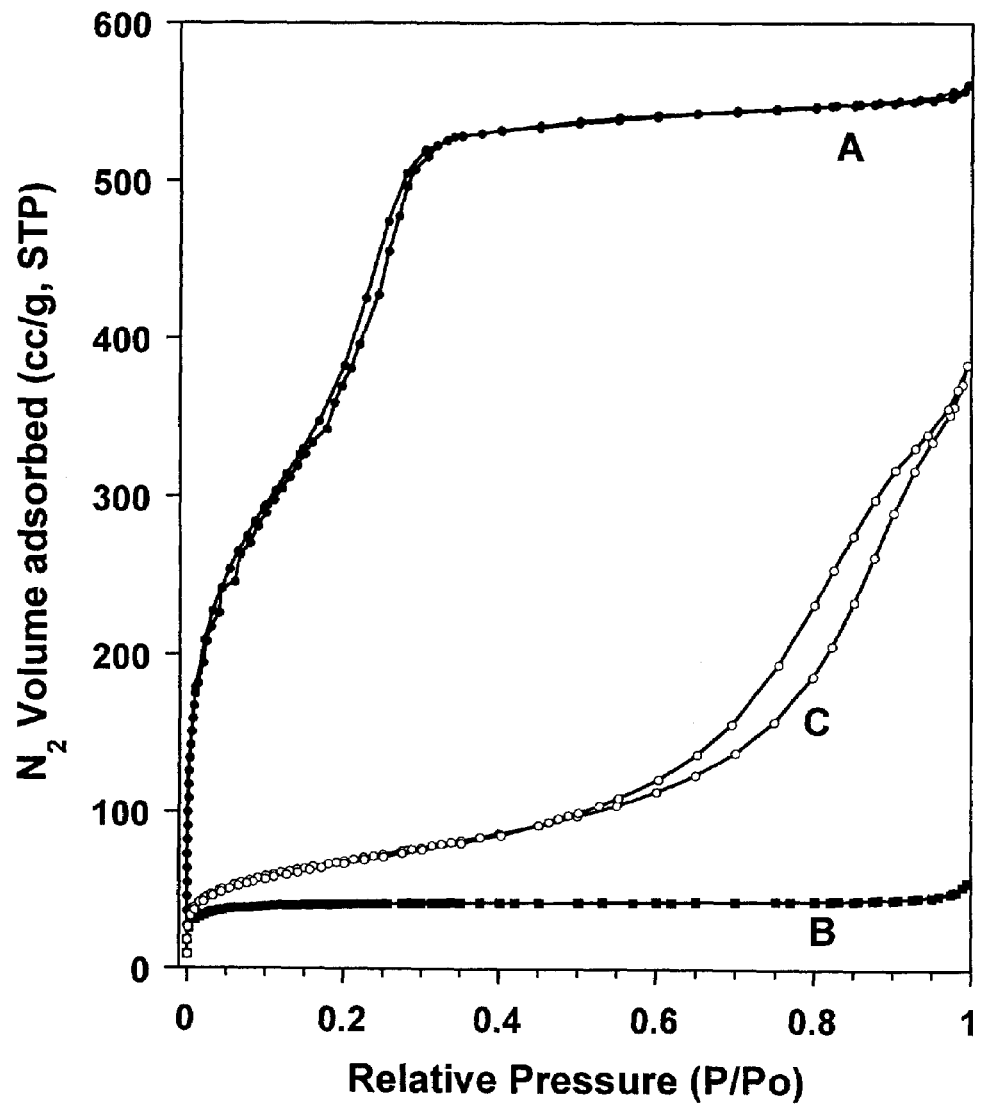
FIG. 6 displays the $N_2$ adsorption and desorption isotherms for the product of MCM-41. Curve (A) for calcination at 650° C. for 4 hours. Curve (B) for calcination at 1000° C. for 4 hours. Curve (C) for the calcined sample (650° C.) after hydrothermal treatment in $H_2O$ at 100° C. for 56 hours.
Figure 7:
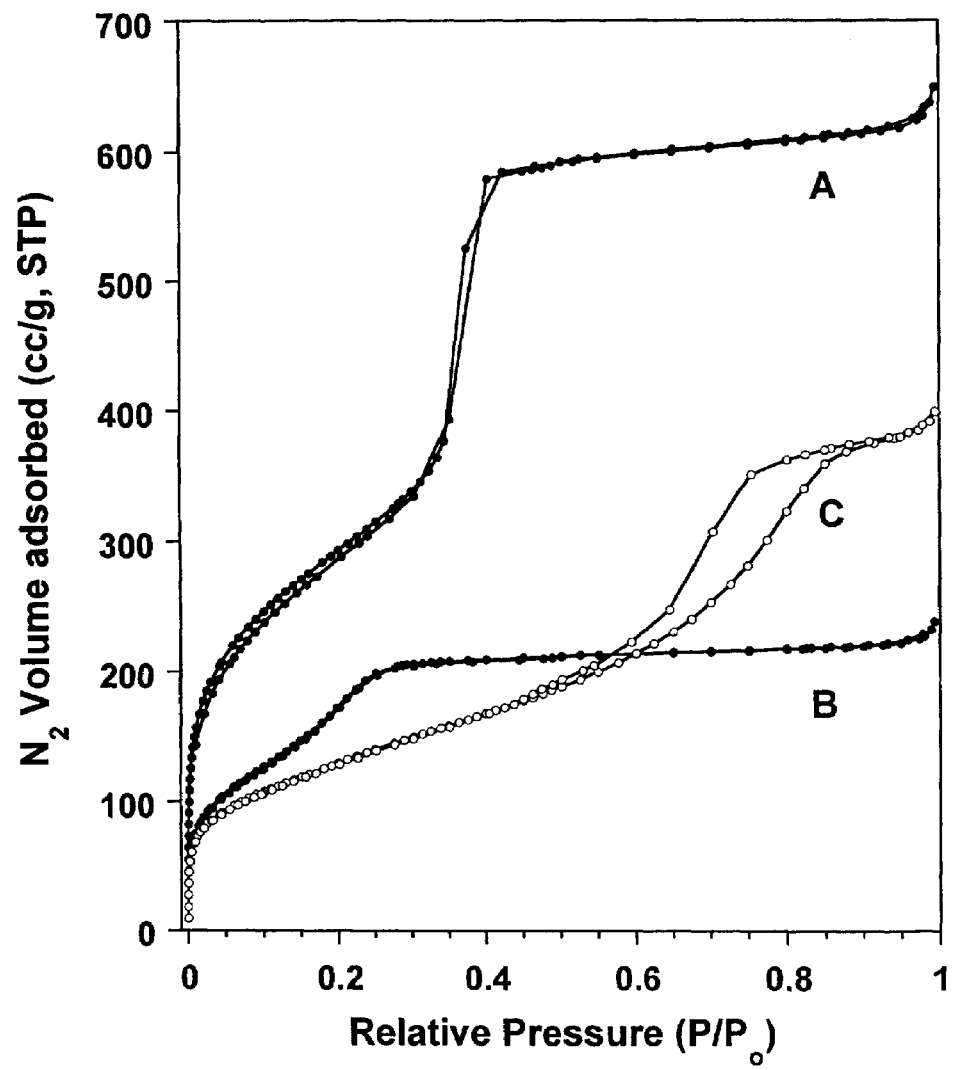
FIG. 7 displays the $N_2$ adsorption and desorption isotherms for the product of KIT-1. Curve (A) is for the sample calcined at 650° C. for 4 hours. Curve (B) is for the calcined sample at 1000° C. for 4 hours. Curve (C) is for the calcined sample (650° C.) after hydrothermal treatment in $H_2$ at 100° C. for 56 hours.

FIG. 6 shows the $N_2$ adsorption-desorption isotherms of MCM-41 after calcinations at 1000° C. for 4 hours and hydrothermal treatment in $H_2O$ at 100° C. for 56 hours, respectively. After these treatments MCM-41 shows no steps in the $N_2$ adsorption isotherm corresponding to framework mesopores filling between $P/P_o$ at 0.2 and 0.4. This result indicates that MCM-41 suffered structural degradation to amorphous silica after the treatments. After calcination at 1000° C. for 4 hours, KIT-1 still shows a $N_2$ filling step for mesopores between $P/P_o$ at 0.2 and 0.3 (FIG. 7), but the pore volume of the sample (0.35 $cm^3/g$) decreased by 75% relative to that of the calcined sample at 650° C. for 4 hours (0.79 $cm^3/g$). The KIT-1 sample also completely lost the $N_2$ adsorption step for the filling of mesopores after the hydrothermal treatment. Regarding the stability of the KIT-1 sample, we conclude that KIT-1 has some thermal stability (better than MCM-41, but poorer than MSU-G). However, like MCM-41, the hydrothermal stability of KIT-1 is very poor and greatly inferior to MSU-G, as illustrated in Example 6.

EXAMPLE 6

The following examples were prepared to test the thermal and hydrothermal stabilities of the product of Example 2. The same procedure as described above for Examples 5 through 6 was employed for testing the stability of Example 2.

The product exhibited the same $N_2$ adsorption-desorption isotherms (FIG. 8) without any significant change after the hydrothermal treatment at 100° C. for 56 hours. After calcination at 1000° C. for 4 hours, the product exhibited two diffraction lines (FIG. 9) that are consistent with an undulated lamellar structure.

Figure 8:
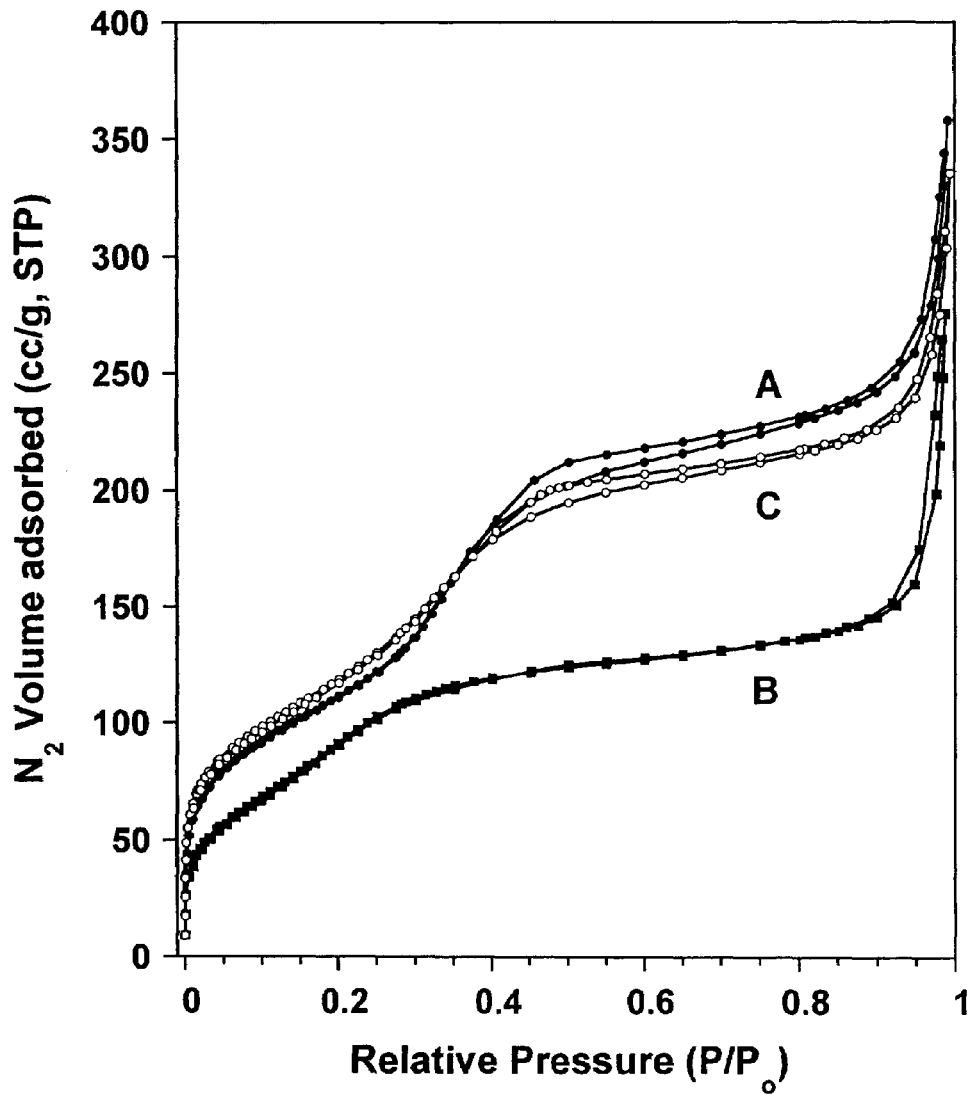
FIG. 8 displays the $N_2$ adsorption and desorption isotherms for the lamellar mesostructured silica product of Example 2. Curve (A) is for the sample calcined at 650° C. for 4 hours. Curve (B) is for the sample calcined at 1000° C. for 4 hours. Curve (C) is for the calcined sample (650° C.) after hydrothermal treatment in $H_2O$ at 100° C. for 56 hours.
Figure 9:
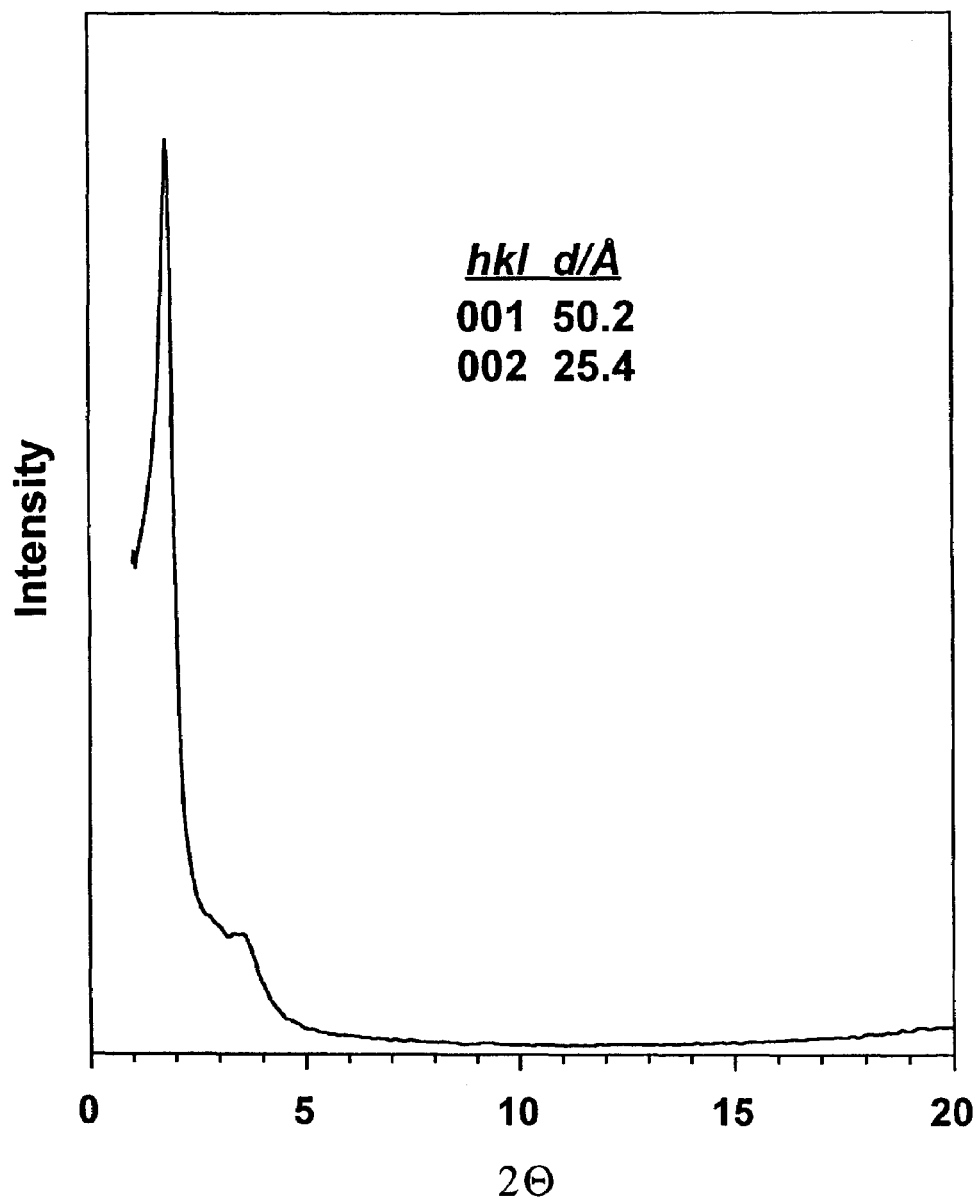
FIG. 9 is a X-ray powder diffraction pattern of the lamellar mesostructured silica product of Example 2 after calcination at 1000° C. for 4 hours.

The sample still showed a step in the $N_2$ adsorption isotherm for the filling of mesopores between $P/P_o$ at 0.2 and 0.3 (FIG. 8). The pore volume of the sample (0.31 $cm^3/g$) only decreased by 25% respective to that of calcined sample at 650° C. for 4 hours (0.42 $cm^3/g$). Thus, the product of Example 2 was found to be superior in thermal and hydrothermal stability among the all previously reported mesoporous silica mesostructures.

XRD patterns, BET surface areas, HK pore size distributions and pore wall thicknesses of the calcined product are summarized in Table 2.

TABLE 2

| Example | Formula of metal source | Amount of Template used (g) | $d_{001}$ (Å) | HK pore size (Å) | BET Surface area ($m^2/g$) | Wall thickness (Å) |
|---|---|---|---|---|---|---|
| 8 | Ti[OCH(CH$_3$)$_2$]$_4$ | 0.14 | 58.1 | 32 | 450 | 26.1 |
| 9 | Al(NO$_3$)$_3$ | 0.19 | 59.6 | 34 | 468 | 25.6 |
| 10 | Al[C$_2$H$_5$CH(CH$_3$)O]$_3$ | 0.12 | 59.6 | 34 | 444 | 25.6 |
| 11 | NaAlO$_2$ | 0.04 | 58.9 | 34 | 452 | 24.9 |

EXAMPLE 7

This example describes another preparation art for the incorporated Al centers into the framework of an Example 2 silica by post-synthesis reaction of the mesostructure in the absence of template.

Figure 10:
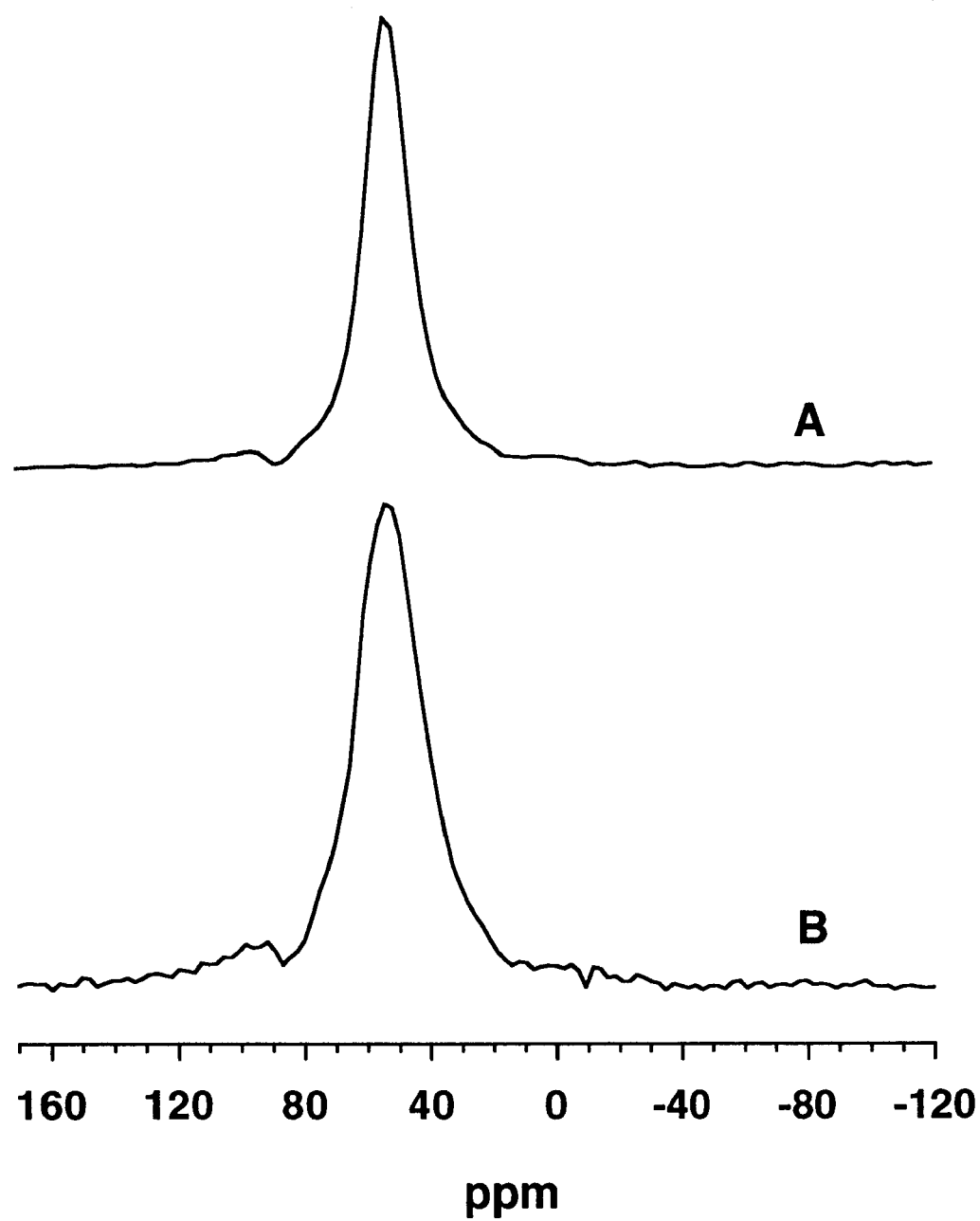
FIG. 10 is a $^{27}Al$ MAS NMR spectrum of the lamellar mesostructured silica product of Example 2 as-synthesized (A) and calcined at (B) of Example 2.

One gram of the air-dried and non-calcined product of Example 2 was mixed with 100 milliliters of EtOH, stirred and refluxed for 1 hour. The product was then filtered and washed with another portion of EtOH (100 milliliters). The above washing procedure was repeated twice and the filtered product was air-dried at 100° C. overnight. The solvent extraction led to the removal of more than 95% of the template, which was confirmed by C, H, N elemental analysis and $^{13}$C MAS NMR. Alumination was conducted by heating a 0.5 gram of ethanol-extracted product in 25 milliliters of 0.1 M aqueous solution of sodium aluminate in a tightly sealed flask. The flask was immersed in an oil bath at 60° C. for 1 hour. The sample was filtered, washed with water, and calcined in air at 620° C. for 4 hours. Elemental analysis for the Si/Al ratio was performed by inductively coupled plasma emission spectroscopy. The Si/Al ratio of the final product was 11.7. The XRD pattern of the final product exhibited a $d_{001}$ reflection centered at 58±1 Å. The SBET of this sample is 365 $m^2/g$. $^{27}$Al MAS NMR spectra of as-synthesized and calcined Example 2 only exhibit a resonance at 53 ppm relative to 1.0M aqueous aluminum nitrate for tetrahedral Al sites (FIG. 10). This indicates that the alumination of MSU-G silica materials can be easily accomplished.

EXAMPLE 8–11

The following examples describe the preparation art of incorporated Ti and Al sites into framework of mesostructured silicas from Example 2 by postsynthesis reaction in the presence of surfactant template in the framework. The molar ratio of metal to silicon in the final composition was 2% mole.

The same preparation art described in Example 1 through 3 was employed. An appropriate amount of metal source was added to the as-synthesized silica materials in its mother liquor. The resultant mixture was stirred for 20 minutes and heated again for 48 hours at 100° C. After the autoclave was cooled to room temperature, the product was filtered, washed with water and ethanol, and air-dried. The template was removed through calcination in air at 650° C. for 4 hours. The metal sources and specific amounts of metal source used in each particular example together with the XRD patterns, BET surface areas, HK pore size distributions and pore wall thicknesses of the calcined product are summarized in Table 2.

$^{27}$Al MAS NMR spectra of as-synthesized and calcined product of Examples 9 through 10 exhibit the high intensity peak at 53 ppm corresponding to tetrahedral Al species with the low intensity peak at 0 ppm corresponding to octahedral Al species. In contrast, the $^{27}$Al MAS NMR spectra of Example 11 exhibited mainly a single peak at around 53 ppm.

EXAMPLES 12–17

The following examples illustrate the ability of extended gemini surfactants with larger alkyl chains between the two amino groups, (e.g., $C_nH_{2n+1}NH(CH_2)_mNH_2$, abbreviated as $C°_{n-m-0}$, where; n=10, 12, 14 and m=3, 4) to act as templating agents for mesostructure formation in the manner of the present invention. These extended gemini surfactants were synthesized by previously described procedures (F. W. Short, E. F. Elslager, A. M. Moore, M. J. Sullivan and F. H. Tendick, *J. Am. Chem. Soc.*, 80, 223, (1958)).

Solutions of $C°_{n-m-0}$ were prepared as in the manner of the preparation art of Examples 1 through 3. Si(OC$_2$H$_5$)$_4$ in the appropriate amount was added at once to the surfactant solution so that the Si:surfactant molar ratio was 10:1. The remainder of the synthesis procedure was identical to the preparation art described in Examples 1 through 3. The products after calcination at 650° C. exhibited XRD patterns, BET surface areas, HK pore size distributions and pore wall thickness as described in Table 3.

TABLE 3

| Example | Template formula | Amount of Template used (g) | $d_{001}$ (Å) | HK pore size (Å) | BET Surface area ($m^2/g$) |
|---|---|---|---|---|---|
| 12 | $C°_{10-3-0}$ | 1.34 | 39.1 | 30 | 650 |
| 13 | $C°_{12-3-0}$ | 1.51 | 54.2 | 37 | 461 |
| 14 | $C°_{14-3-0}$ | 1.68 | 62.0 | 43 | 380 |
| 15 | $C°_{10-4-0}$ | 1.43 | 48.0 | 32 | 614 |
| 16 | $C°_{12-4-0}$ | 1.60 | 53.9 | 34 | 465 |
| 17 | $C°_{14-4-0}$ | 1.76 | 78.9 | 46 | 574 |

EXAMPLE 18

This example describes a preparation art for introducing functionalized organosilane moieties into the framework of MSU-G silicas by reaction of the lamellar silica framework with hydrolyzable organosilanes.

One gram of the as-synthesized product obtained in Example 2 silica was extracted with hot ethanol to remove the surfactant and then dried under vacuum at 100° C. The dried, surfactant-free mesostructure was then refluxed with one gram of 3-mercaptopropyltrimethoxy-silane in twenty five milliliters of dry toluene for 48 h. The functionalized product was then filtered, washed several times with toluene followed by EtOH, and subject to Soxhlet extraction over EtOH for 18 h in order to remove residual (ungrafted) organo silane. This product was dispersible in organic solvents, indicating that the surface was made hydrophobic through grafting reaction of the surface silanol groups of the silica framework with the organosilane. The XRD pattern of the functionalized derivative gave a $d_{001}$ XRD peak near 57 Å, indicating the retention of the lamellar framework structure after function.

EXAMPLE 19

This Example illustrates the assembly of a MSU-G silica composition in the presence of a gemini amine surfactant C°$_{12-2-0}$ and a co-surfactant Jeffamine D-400, an alpha,omega propylene oxide diamine. Many other co-surfactant may be used in place of the Jeffamine co-surfactant, including 1, 3, 5-trimethylbenzene, alkyl monoamines, polyethylene oxide-based surfactants, and the like.

Figure 11:
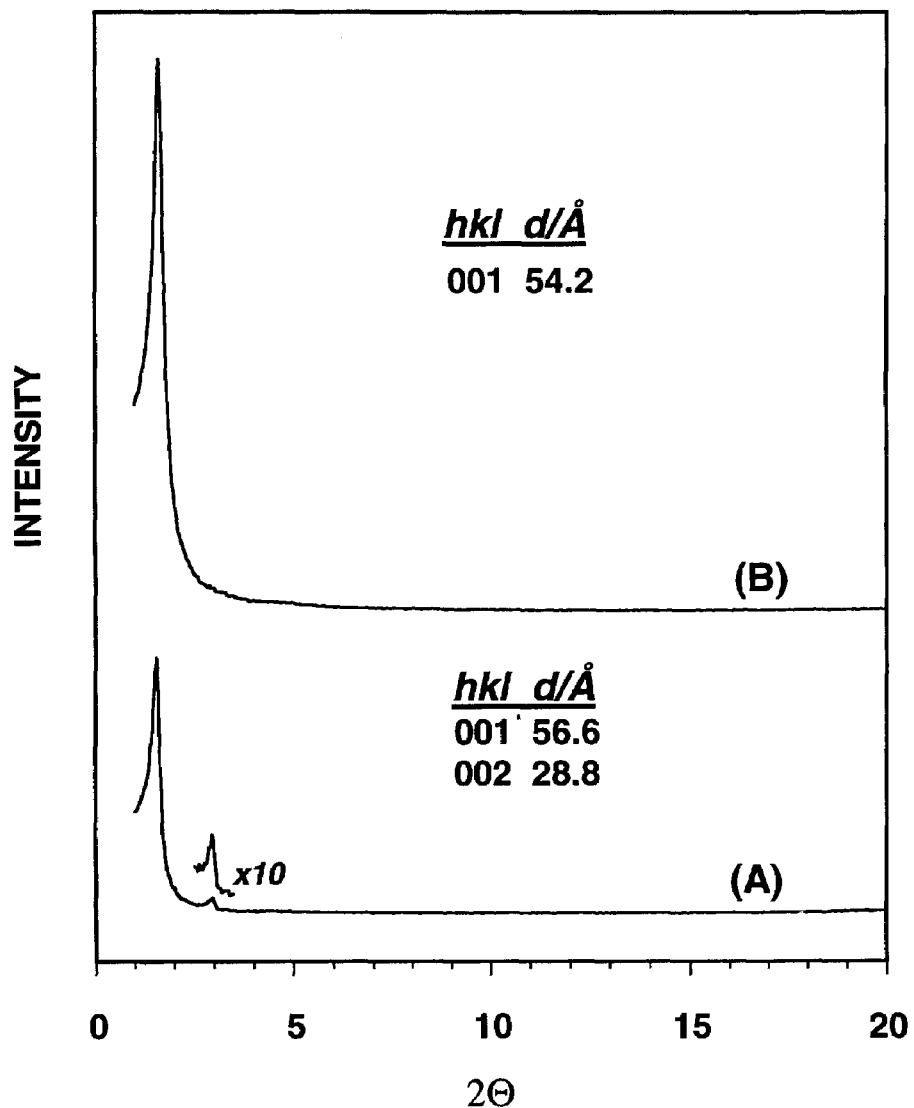
FIG. 11 is a graph showing XRD patterns for the product formed according to Example 13; (A) as synthesized and (B) after calcination at 650° C.
Figure 12:
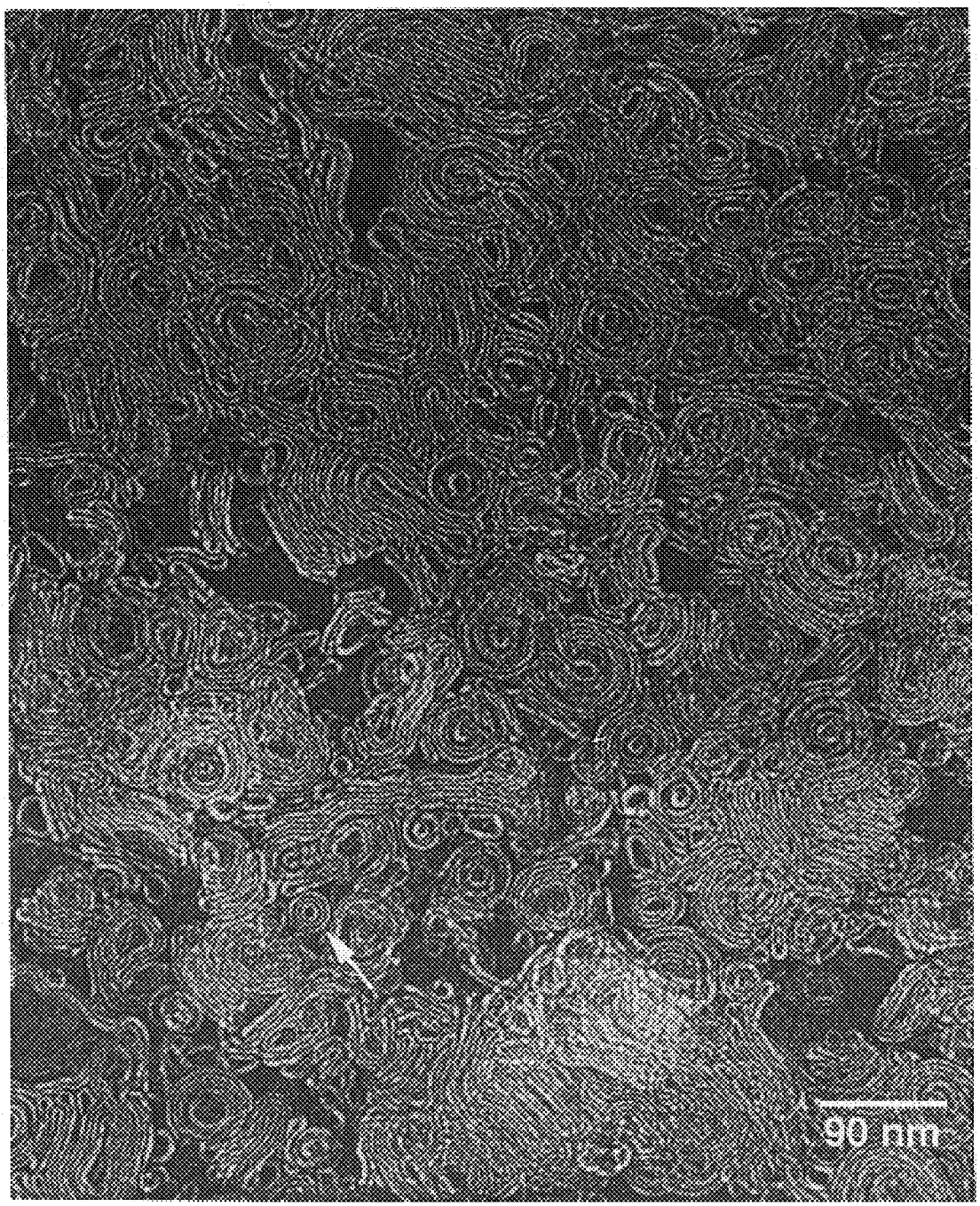
FIG. 12 is a TEM image of the calcined (650° C.) sample prepared according to Example 19.

The surfactant mixture was prepared by adding 0.43 gram of C°$_{12-2-0}$ and 1.75 gram of Jeffamine D-400 in thirty five milliliters of deionized $H_2O$ and five milliliters of ethanol, affording a C°$_{12-2-0}$:Jeffamine D-400 molar ratio of 1.0:2.3. The resultant mixture was stirred at room temperature for 20 h until a milky solution was obtained. $Si(OC_2H_5)_4$ was added at once in the appropriate amount so that the Si:surfactant molar ratio was 4:1 as in the preparation art of Examples 1 through 3. The remainder of the synthesis was identical to the preparation art described in Examples 1 through 3. The XRD pattern of the calcined product exhibited a $d_{001}$ reflection centered at 50.2 Å. The SBET surface area of this sample was 422 m²/g. The $^{27}Si$ MAS NMR spectrum of as-synthesized Example 19 exhibited two lines with relative intensities corresponding to a $Q^4/Q^3$ ratio of 9.4. A TEM image of this product (FIG. 11) revealed a folded ribbon-like hierarchical structure for several of the fundamental particles comprising this product. Some particles also adopt an onion-like structure wherein composite spheres are formed through the concentric nesting of smaller and smaller silica spheres, one within another. Each concentric silica sphere is composed of a single silica nanolayer that has closed upon itself to form a sphere. Channels between the concentric silica spheres provide framework mesopores for adsorption and chemical transformation (catalysis) of guest molecules.

It is intended that the foregoing description be only illustrative and that the present invention be limited only by the hereinafter appended claims.

We claim:

1. A lamellar mesoporous inorganic oxide and silica composition, wherein the inorganic oxide is other than silica, wherein the composition was derived from a mesoporous silica composition without the inorganic oxide composition containing an electrically neutral amine surfactant, wherein the surfactant is of the formula:

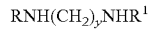

wherein y is 1 to 4, R is an alkyl moiety containing 10 to 20 carbon atoms and $R_1$ is selected from the group consisting of hydrogen, methyl, ethyl and $(CH_2)_mNH_2$ wherein m is 1, 2, 3 or 4 in mesopores, which surfactant has been removed from the silica composition which silica composition without the inorganic oxide was then treated post-synthesis of the mesoporous silica composition with one or more of an inorganic oxide forming compound of an inorganic element and the surfactant and then the treated silica composition was heated to form the inorganic oxide over and on silica composition so that the inorganic oxide and silica composition is lamellar and mesoporous, wherein the inorganic element is selected from the group consisting of B, Al, Ga, Fe, Co, Mn, Cr, Ge, Ti, V, Ni, Sn, Sb, Zr, W, Mo, Ca, Cu, Pb, In, Nb, Sr, and Zn.

2. The composition of claim 1 wherein cross-linking of $SiO_4$ tetrahedra in the silica to four adjacent silicon sites ($Q^4$) and to three adjacent silicon sites ($Q^3$) corresponds to a $Q^4/Q^3$ ratio of at least 5.

3. The composition of claim 1 with at least one x-ray diffraction line corresponding to a basal spacing of 4 to 10 nm.

4. The composition of claim 1 wherein the surfactant has the formula:

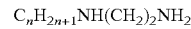

where n is an integer between 8 and 20.

5. The composition of claim 1 wherein a particle morphology of the silica composition without the inorganic oxide forming compound is vesicular, bowlshaped, tubeshaped, of an onion layer morphology, or folded ribbon-shaped with a diameter between about 10 and 1400 nm and with a shell thickness between about 2.0 nm and 200 nm, and wherein the shell thickness is comprised of between about 1 and about 50 nanolayers.

6. The composition of claim wherein the inorganic oxide and silica composition is functionalized by reaction with an organosilane selected from the group consisting of $X_3SiR$, $X_2SiR_2$, $XSiR_3$ and mixtures thereof where X is a hydrolyzable moiety and R is an organic moiety which contains an organic functional group.

7. A lamellar mesoporous inorganic oxide and silica composition derived from a mixed mesoporous silica composition and an inorganic element oxide forming compound applied with a surfactant post-synthesis of the mesoporous silica composition over the mesoporous silica composition wherein the surfactant is of the formula:

wherein y is 1 to 4, R is an alkyl moiety containing 10 to 20 carbon atoms and $R^1$ is selected from the group consisting of hydrogen, methyl, ethyl and $(CH_2)_mNH_2$ wherein m is 1, 2, 3 or 4 and heated so as to be over the silica composition and so that the inorganic oxide and silica composition is lamellar and mesoporous, wherein the inorganic element is selected from the group consisting of B, Al, Ga, Fe, Co, Mn, Cr, Ge, Ti, V, Ni, Sn, Sb, Zr, W, Mo, Ca, Cu, Pb, In, Nb, Sr, and Zn.

8. The composition of claim 7 with at least one x-ray diffraction line corresponding to a basal spacing of 4 to 10 nm.

* * * * *

UNITED STATES PATENT AND TRADEMARK OFFICE
CERTIFICATE OF CORRECTION

PATENT NO. : 7,132,165 B2
APPLICATION NO. : 10/272751
DATED : November 7, 2006
INVENTOR(S) : Thomas J. Pinnavaia, Seong-Su Kim and Wenzhong Zhang It is certified that error appears in the above-identified patent and that said Letters Patent is hereby corrected as shown below:

Column 21, line 43, "SBET" should be --$S_{BET}$--.

Column 23, line 36, "SBET" should be --$S_{BET}$--.

Column 24, line 2, "and $R_1$ is" should be --and $R^1$ is--.

Column 24, line 36, "of claim wherein" should be --of claim 1 wherein--.

Signed and Sealed this

Twenty-second Day of May, 2007

JON W. DUDAS
*Director of the United States Patent and Trademark Office*